US010750545B2

(12) United States Patent
Kuroda

(10) Patent No.: US 10,750,545 B2
(45) Date of Patent: *Aug. 18, 2020

(54) WIRELESS COMMUNICATION SYSTEM AND METHOD OF CONTROLLING A TRANSMISSION POWER

(71) Applicant: NEC CORPORATION, Tokyo (JP)

(72) Inventor: Nahoko Kuroda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,909

(22) Filed: Apr. 11, 2019

(65) Prior Publication Data
US 2019/0239256 A1 Aug. 1, 2019

Related U.S. Application Data

(63) Continuation of application No. 15/138,308, filed on Apr. 26, 2016, which is a continuation of application (Continued)

(30) Foreign Application Priority Data

Nov. 4, 2005 (JP) ................. 2005-321543

(51) Int. Cl.
H04W 52/50 (2009.01)
H04W 74/08 (2009.01)
(Continued)

(52) U.S. Cl.
CPC ....... H04W 74/0833 (2013.01); H04W 52/24 (2013.01); H04W 52/325 (2013.01);
(Continued)

(58) Field of Classification Search
CPC ............ H04W 74/0388; H04W 52/36; H04W 52/325; H04W 52/24; H04W 52/50;
(Continued)

(56) References Cited

U.S. PATENT DOCUMENTS 5,299,201 A   3/1994  Carusone et al.
5,465,399 A  11/1995  Oberholtzer et al.
(Continued)

FOREIGN PATENT DOCUMENTS

CN    1345490 A    4/2002
CN    1385976 A   12/2002
(Continued)

OTHER PUBLICATIONS

3GPP TR 25.814 v0.2.0; 2005-2008; 3rd Generation Partnership Project; Technical Specification Group Radio Access Network; Physical Layer Aspects for Evolved UTRA (Release 7).
(Continued)

Primary Examiner — Hai V Nguyen
(74) Attorney, Agent, or Firm — Sughrue Mion, PLLC

(57) ABSTRACT

A base station is provided which notifies a mobile station of transmission power information for an uplink RACH, the mobile station transmits transmission delay estimation information on the RACH to the base station over the RACH at a transmission power based on the transmission power information, and the base station changes the transmission power information according to the transmission delay estimation information and notifies the mobile station of the changed transmission power information. The mobile station retransmits data or a preamble if the mobile station does not receive a notification that the base station has received the data or the preamble correctly after a predetermined (Continued)

time. The base station transmits the transmission power information over a BCH and a CPICH transmitted to a plurality of mobile stations.

34 Claims, 13 Drawing Sheets

Related U.S. Application Data

No. 13/943,950, filed on Jul. 17, 2013, now Pat. No. 9,369,968, which is a continuation of application No. 12/092,002, filed as application No. PCT/JP2006/321981 on Nov. 2, 2006, now Pat. No. 8,515,480.

(51) Int. Cl.
*H04W 52/24* (2009.01)
*H04W 52/32* (2009.01)
*H04W 52/36* (2009.01)
*H04W 28/18* (2009.01)
*H04W 48/08* (2009.01)
*H04W 52/14* (2009.01)
*H04W 52/48* (2009.01)
*H04W 88/08* (2009.01)

(52) U.S. Cl.
CPC .......... *H04W 52/36* (2013.01); *H04W 52/50* (2013.01); *H04W 28/18* (2013.01); *H04W 48/08* (2013.01); *H04W 52/146* (2013.01); *H04W 52/48* (2013.01); *H04W 88/08* (2013.01)

(58) Field of Classification Search
CPC ... H04W 28/18; H04W 48/08; H04W 52/146; H04W 52/48; H04W 88/08
USPC ........................................... 370/329; 455/522
See application file for complete search history.

(56) References Cited

U.S. PATENT DOCUMENTS

| | | | |
|---|---|---|---|
| 5,564,075 A | 10/1996 | Gourgue | |
| 5,692,019 A | 11/1997 | Chang et al. | |
| 6,094,576 A * | 7/2000 | Hakkinen | H04W 52/50 455/422.1 |
| 6,167,240 A * | 12/2000 | Carlsson | H04W 52/244 455/501 |
| 6,175,745 B1 * | 1/2001 | Bringby | H04W 52/243 455/522 |
| 6,181,686 B1 | 1/2001 | Hamalainen et al. | |
| 6,292,471 B1 | 9/2001 | Cao et al. | |
| 6,381,229 B1 * | 4/2002 | Narvinger | H04J 13/0044 13/44 |
| 6,535,547 B1 * | 3/2003 | Lyckeg.ang.rd | H04J 13/004 370/322 |
| 6,549,564 B1 * | 4/2003 | Popovic | H04L 27/2078 375/142 |
| 6,574,267 B1 * | 6/2003 | Kanterakis | H04B 1/707 370/342 |
| 6,597,675 B1 * | 7/2003 | Esmailzadeh | H04J 13/107 370/335 |
| 6,606,313 B1 * | 8/2003 | Dahlman | H04L 1/1867 370/347 |
| 6,628,956 B2 * | 9/2003 | Bark | H04W 52/36 455/522 |
| 6,642,845 B2 | 11/2003 | Ishiwatari | |
| 6,643,318 B1 | 11/2003 | Parsa et al. | |
| 6,778,835 B2 * | 8/2004 | You | H04J 13/0044 13/44 |
| 6,795,412 B1 | 9/2004 | Lee | |
| 6,917,602 B2 | 7/2005 | Toskala et al. | |
| 6,956,829 B2 * | 10/2005 | Lee | H04B 7/2618 370/280 |
| 6,963,540 B2 | 11/2005 | Choi et al. | |
| 7,013,146 B2 | 3/2006 | Wang et al. | |
| 7,065,183 B1 | 6/2006 | Raaf | |
| 7,072,327 B2 | 7/2006 | Dick | |
| 7,076,262 B1 * | 7/2006 | Bhatoolaul | H04L 1/1671 455/161.2 |
| 7,113,496 B2 * | 9/2006 | Koo | H04B 7/2637 370/335 |
| 7,120,132 B2 | 10/2006 | Choi et al. | |
| 7,164,660 B2 * | 1/2007 | Baker | H04W 52/24 370/318 |
| 7,181,170 B2 | 2/2007 | Love et al. | |
| 7,197,314 B2 * | 3/2007 | Soldani | H04L 1/18 455/450 |
| 7,218,950 B2 * | 5/2007 | Qiu | H04J 13/00 455/522 |
| 7,233,577 B2 * | 6/2007 | Choi | H04W 52/143 370/252 |
| 7,239,884 B2 | 7/2007 | Khawand et al. | |
| 7,283,815 B2 | 10/2007 | Kim et al. | |
| 7,302,276 B2 * | 11/2007 | Bernhardsson | H04W 52/14 455/226.1 |
| 7,307,971 B2 | 12/2007 | Park et al. | |
| 7,315,573 B2 | 1/2008 | Lusky et al. | |
| 7,324,465 B2 * | 1/2008 | Lim | H04B 7/18558 370/278 |
| 7,359,427 B2 * | 4/2008 | Kanterakis | H04B 1/707 370/335 |
| 7,398,108 B2 * | 7/2008 | Hondo | H04W 74/002 455/561 |
| 7,420,984 B2 * | 9/2008 | Chen | H04W 72/1278 370/437 |
| 7,436,801 B1 * | 10/2008 | Kanterakis | H04W 74/008 370/329 |
| 7,489,722 B2 * | 2/2009 | Denk | H04B 1/707 375/140 |
| 7,489,948 B2 | 2/2009 | Taromaru et al. | |
| 7,492,741 B2 | 2/2009 | Lee | |
| 7,509,554 B2 * | 3/2009 | Lohr | H04L 1/1845 714/748 |
| 7,701,961 B2 | 4/2010 | Lim et al. | |
| 7,702,319 B1 * | 4/2010 | Arslan | H04W 4/20 455/414.4 |
| 7,706,824 B2 | 4/2010 | Schulist et al. | |
| 7,733,896 B2 * | 6/2010 | Chuah | H04W 74/0875 370/329 |
| 7,738,889 B2 | 6/2010 | Nakada | |
| 7,773,714 B2 * | 8/2010 | Khawand | G06F 9/542 375/354 |
| 7,778,218 B2 | 8/2010 | Holma et al. | |
| 7,792,079 B2 * | 9/2010 | Choi | H04W 36/0072 370/331 |
| 7,852,824 B2 | 12/2010 | Wang et al. | |
| 7,852,902 B2 | 12/2010 | Reial et al. | |
| 7,873,000 B2 * | 1/2011 | Cheng | H04W 74/0833 370/329 |
| 7,876,729 B1 * | 1/2011 | Grilli | H04W 36/14 370/332 |
| 7,907,962 B2 * | 3/2011 | Shoji | H04W 52/42 455/522 |
| 8,000,295 B2 * | 8/2011 | Cheng | H04W 72/04 370/329 |
| 8,000,305 B2 * | 8/2011 | Tan | H04J 13/004 370/335 |
| 8,018,904 B2 | 9/2011 | Hamalainen et al. | |
| 8,085,738 B2 * | 12/2011 | Park | H04W 28/06 370/336 |
| 8,130,141 B2 * | 3/2012 | Pattabiraman | G01S 19/11 342/357.29 |
| 8,199,778 B2 * | 6/2012 | Shimomura | H04W 74/004 370/328 |
| 8,213,370 B2 | 7/2012 | Fischer | |
| 8,369,860 B2 * | 2/2013 | Zhang | H04L 1/0015 455/450 |

(56) References Cited

U.S. PATENT DOCUMENTS

| | | | | |
|---|---|---|---|---|
| 8,391,223 B2* | 3/2013 | Barraclough | H04W 74/006 | 370/329 |
| 8,451,804 B2* | 5/2013 | Vujcic | H04L 47/14 | 370/336 |
| 8,515,480 B2* | 8/2013 | Kuroda | H04W 74/0833 | 455/522 |
| 8,547,949 B2 | 10/2013 | Fischer et al. | | |
| 8,565,212 B2* | 10/2013 | Zhang | H04L 5/006 | 370/344 |
| 8,588,839 B2* | 11/2013 | Blomgren | H04W 52/12 | 455/522 |
| 8,687,564 B2* | 4/2014 | Vujcic | H04B 7/2637 | 370/329 |
| 8,718,020 B2 | 5/2014 | Cave et al. | | |
| 8,718,667 B2 | 5/2014 | Song et al. | | |
| 8,831,671 B2* | 9/2014 | Gholmieh | H04W 52/10 | 455/522 |
| 8,879,478 B2 | 11/2014 | Vujcic | | |
| 8,897,276 B2 | 11/2014 | Ranta-Aho et al. | | |
| 8,908,612 B2 | 12/2014 | Wigard et al. | | |
| 8,917,711 B2 | 12/2014 | Hakola | | |
| 8,958,317 B2 | 2/2015 | Ahn et al. | | |
| 8,989,082 B2 | 3/2015 | Wigard et al. | | |
| 9,084,165 B2 | 7/2015 | Bajj et al. | | |
| 9,144,033 B2 | 9/2015 | Speight et al. | | |
| 9,301,283 B2* | 3/2016 | Zhang | H04L 5/006 | |
| 9,369,968 B2* | 6/2016 | Kuroda | H04W 74/0833 | |
| 9,456,423 B2* | 9/2016 | Gholmieh | H04W 52/244 | |
| 9,603,099 B2* | 3/2017 | Shin | H04W 52/08 | |
| 9,781,706 B2* | 10/2017 | Zhang | H04L 1/0015 | |
| 9,839,046 B2* | 12/2017 | Pan | H04L 5/006 | |
| 10,057,888 B2* | 8/2018 | Cave | H04L 1/1854 | |
| 2001/0024956 A1* | 9/2001 | You | H04J 13/0044 | 13/44 |
| 2001/0026543 A1 | 10/2001 | Hwang et al. | | |
| 2001/0038619 A1* | 11/2001 | Baker | H04W 52/24 | 370/335 |
| 2001/0040874 A1* | 11/2001 | Saito | H04B 1/71072 | 370/282 |
| 2001/0046220 A1 | 11/2001 | Koo et al. | | |
| 2001/0046864 A1* | 11/2001 | Bhatoolaul | H04W 52/04 | 455/442 |
| 2001/0053140 A1* | 12/2001 | Choi | H04B 7/264 | 370/335 |
| 2002/0009129 A1 | 1/2002 | Choi et al. | | |
| 2002/0080748 A1 | 6/2002 | Dick | | |
| 2002/0131379 A1* | 9/2002 | Lee | H04B 7/2618 | 370/333 |
| 2002/0136192 A1 | 9/2002 | Holma et al. | | |
| 2002/0159395 A1* | 10/2002 | Nelson, Jr. | H04W 52/24 | 370/252 |
| 2002/0181557 A1 | 12/2002 | Fujii | | |
| 2003/0060224 A1* | 3/2003 | Nelson, Jr. | H04L 1/1607 | 455/522 |
| 2003/0076812 A1* | 4/2003 | Benedittis | H04W 74/002 | 370/350 |
| 2003/0086369 A1 | 5/2003 | Ishiwatari | | |
| 2003/0103476 A1* | 6/2003 | Choi | H04W 52/143 | 370/329 |
| 2003/0112776 A1* | 6/2003 | Brown | H04B 1/7117 | 370/335 |
| 2003/0139170 A1* | 7/2003 | Heo | H04W 74/008 | 455/410 |
| 2003/0223452 A1* | 12/2003 | Toskala | H04W 52/50 | 370/442 |
| 2004/0008658 A1* | 1/2004 | Dahlman | H04W 74/006 | 370/342 |
| 2004/0014452 A1* | 1/2004 | Lim | H04B 7/18558 | 455/403 |
| 2004/0029604 A1* | 2/2004 | Raaf | H04W 52/226 | 455/522 |
| 2004/0077357 A1* | 4/2004 | Nakada | H04B 1/70755 | 455/452.1 |
| 2004/0082356 A1 | 4/2004 | Walton et al. | | |
| 2004/0110521 A1* | 6/2004 | Soldani | H04L 1/18 | 455/509 |
| 2004/0146019 A1* | 7/2004 | Kim | H04W 74/002 | 370/329 |
| 2004/0156328 A1* | 8/2004 | Walton | H04B 7/0413 | 370/313 |
| 2004/0184421 A1* | 9/2004 | Hondo | H04W 74/002 | 370/329 |
| 2004/0204101 A1* | 10/2004 | Qiu | H04J 13/00 | 455/561 |
| 2004/0219931 A1* | 11/2004 | Bi | H04W 64/00 | 455/456.1 |
| 2005/0002361 A1* | 1/2005 | Dick | H04B 7/2628 | 370/335 |
| 2005/0143118 A1* | 6/2005 | Bernhardsson | H04W 52/14 | 455/522 |
| 2005/0170800 A1 | 8/2005 | Taromaru et al. | | |
| 2005/0174968 A1 | 8/2005 | Kitade et al. | | |
| 2005/0202818 A1* | 9/2005 | Hondo | H04W 52/12 | 455/434 |
| 2005/0232158 A1* | 10/2005 | Hondo | H04W 74/002 | 370/241 |
| 2005/0259621 A1 | 11/2005 | Lee | | |
| 2005/0271025 A1 | 12/2005 | Guethaus et al. | | |
| 2006/0019661 A1 | 1/2006 | Tanoue | | |
| 2006/0035660 A1 | 2/2006 | Anderson | | |
| 2006/0098599 A1* | 5/2006 | Choi | H04W 36/0072 | 370/331 |
| 2006/0105798 A1 | 5/2006 | Ghosh et al. | | |
| 2006/0120438 A1 | 6/2006 | Reial | | |
| 2006/0126573 A1* | 6/2006 | Dick | H04B 1/7077 | 370/335 |
| 2007/0064665 A1* | 3/2007 | Zhang | H04L 5/006 | 370/343 |
| 2007/0076785 A1 | 4/2007 | Reial et al. | | |
| 2007/0142070 A1 | 6/2007 | Soldani et al. | | |
| 2008/0056182 A1* | 3/2008 | Usuda | H04L 1/0007 | 370/329 |
| 2008/0074999 A1 | 3/2008 | Usuda et al. | | |
| 2008/0102875 A1* | 5/2008 | Shoji | H04W 52/16 | 455/522 |
| 2008/0132265 A1 | 6/2008 | Tudosoiu | | |
| 2008/0165697 A1* | 7/2008 | Zeira | H04L 1/0026 | 370/252 |
| 2008/0253323 A1* | 10/2008 | Fischer | H04W 74/0866 | 370/329 |
| 2008/0285488 A1 | 11/2008 | Walton et al. | | |
| 2008/0285669 A1 | 11/2008 | Walton et al. | | |
| 2008/0285670 A1 | 11/2008 | Walton et al. | | |
| 2008/0298325 A1* | 12/2008 | Vujcic | H04L 1/00 | 370/336 |
| 2009/0011718 A1 | 1/2009 | Chun et al. | | |
| 2009/0011786 A1* | 1/2009 | Lee | H04W 52/325 | 455/522 |
| 2009/0046641 A1* | 2/2009 | Wang | H04W 74/002 | 370/329 |
| 2009/0072947 A1 | 3/2009 | Onishi | | |
| 2009/0086673 A1* | 4/2009 | Aminaka | H04W 74/0833 | 370/329 |
| 2009/0154403 A1 | 6/2009 | Niwano | | |
| 2009/0161635 A1 | 6/2009 | Kanterakis et al. | | |
| 2009/0170514 A1* | 7/2009 | Yokoyama | H04W 72/085 | 455/436 |
| 2009/0186624 A1* | 7/2009 | Cave | H04L 1/1887 | 455/450 |
| 2009/0227199 A1* | 9/2009 | Madsen | H04W 48/04 | 455/1 |
| 2009/0257407 A1* | 10/2009 | Park | H04W 28/06 | 370/336 |
| 2009/0286541 A1* | 11/2009 | Maheshwari | H04W 76/10 | 455/436 |
| 2009/0305693 A1* | 12/2009 | Shimomura | H04W 74/004 | 455/422.1 |
| 2009/0311967 A1* | 12/2009 | Takase | H04W 28/02 | 455/67.11 |

(56) References Cited

U.S. PATENT DOCUMENTS

| | | | |
|---|---|---|---|
| 2010/0041428 A1* | 2/2010 | Chen | H04W 52/16 455/522 |
| 2010/0178920 A1* | 7/2010 | Kitazoe | H04W 36/0055 455/436 |
| 2010/0226465 A1 | 9/2010 | Nakayama et al. | |
| 2010/0232318 A1 | 9/2010 | Sarkar | |
| 2010/0278131 A1* | 11/2010 | Jeong | H04W 74/0833 370/329 |
| 2010/0290407 A1* | 11/2010 | Uemura | H04W 74/0866 370/329 |
| 2010/0309877 A1* | 12/2010 | Damnjanovic | H04L 1/0029 370/331 |
| 2011/0002289 A1* | 1/2011 | Gerstenberger | H04W 74/0833 370/329 |
| 2011/0007700 A1* | 1/2011 | Aminaka | H04W 72/0406 370/329 |
| 2011/0051609 A1* | 3/2011 | Ishii | H04B 1/707 370/252 |
| 2011/0110258 A1* | 5/2011 | Ishii | H04J 11/0069 370/252 |
| 2011/0194432 A1* | 8/2011 | Kato | H04W 74/002 370/252 |
| 2011/0280210 A1* | 11/2011 | Zhang | H04L 5/006 370/329 |
| 2012/0002555 A1* | 1/2012 | Ohuchi | H04W 24/08 370/244 |
| 2012/0069809 A1* | 3/2012 | Aminaka | H04W 74/0833 370/329 |
| 2012/0172048 A1* | 7/2012 | Kato | H04L 5/0007 455/450 |
| 2013/0035084 A1* | 2/2013 | Song | H04W 74/0833 455/418 |
| 2013/0301611 A1* | 11/2013 | Baghel | H04L 63/123 370/331 |
| 2013/0308573 A1* | 11/2013 | Kuroda | H04W 74/0833 370/329 |
| 2013/0322386 A1* | 12/2013 | Zhang | H04L 5/006 370/329 |
| 2015/0189601 A1* | 7/2015 | Shin | H04W 52/08 370/252 |
| 2016/0227583 A1* | 8/2016 | Chavva | H04W 4/70 |
| 2016/0242214 A1* | 8/2016 | Kuroda | H04W 74/0833 |
| 2016/0374079 A1* | 12/2016 | Yasukawa | H04W 72/0446 |

FOREIGN PATENT DOCUMENTS

| | | | |
|---|---|---|---|
| CN | 1393063 A | | 1/2003 |
| CN | 1555143 A | | 12/2004 |
| EP | 1309106 A1 | | 5/2003 |
| EP | 1443785 A1 | | 8/2004 |
| EP | 1565029 A2 | | 8/2005 |
| JP | 11-205223 A | | 7/1999 |
| JP | 2000-151502 A | | 5/2000 |
| JP | 2000-184437 A | | 6/2000 |
| JP | 2001-144680 A | | 5/2001 |
| JP | 2005229272 A | | 8/2005 |
| JP | 2006-287489 A | | 10/2006 |
| KR | 10-2004-0019783 A | | 3/2004 |
| WO | 03/041438 A1 | | 5/2003 |

OTHER PUBLICATIONS

3GPP TS 25.214 v6.6.0; 2005-2006; 3rd Generation Partnership Project; Technical Specification Group Radio Access Network; Physical layer procedures (FDD) (Release 6); pp. 1-15.

3GPP TS 25.331 v6.6.0; 2005-2006; 3rd Generation Partnership Project; Technical Specification Group Radio Access Network; Radio Resource Control (RRC); Protocol Specification (Release 6); pp. 1-17.

Advisory Action dated Mar. 20, 2012 issued in parent U.S. Appl. No. 12/092,002.

Chinese Office Action dated Aug. 31, 2011 in corresponding Chinese Patent Application No. 200680041160.4.

Final Office Action dated Nov. 28, 2011 issued in parent U.S. Appl. No. 12/092,002.

Non-Final Office Action dated Jun. 23, 2011, issued in parent U.S. Appl. No. 12/092,002.

Non-Final Office Action dated Sep. 6, 2012, in parent U.S. Appl. No. 12/092,002.

Notice of Allowance dated Apr. 18, 2013, in parent U.S. Appl. No. 12/092,002.

United Kingdom Combined Search and Examination Report dated Jul. 29, 2010 issued in Application No. 1919851.2.

Communication dated Nov. 30, 2016, from the State Intellectual Property Office of People's Republic of China in counterpart Application No. 200680041160.4.

3GPP TS 25.331 V6.7.0, (Sep. 2005) (1167 pages total).

3GPP TR 25.896 V6.0.0 (Mar. 2004) (179 pages total).

3GPP TS 25.321 V6.6.0 (Sep. 2005) (86 pages total).

3GPP TS 25.303 V6.3.0 (Jun. 2005) (76 pages total).

"On Improved Reception of SIB", Siemens, 3GPP TSG RAN2#49, Korea, Seoul, 07.-11.11.2005, Tdoc R2-052831 (3 pages total).

"Comparison of RACH/measurement collision detection at L1 versus at MAC", Discussion paper on R1-02-1005, (LS about Correction of the PRACH ramp up procedure for collision with FACH measurement occasion) avoidance, Mitsubishi Electric Telecom Europe, TSG-RAN Working Group 2 meeting #31, Stockholm, Sweden, Aug. 19-23, 2002, R2-021990 (7 pages total).

"Fast physical random access—RACH Access Time reduction gain", Samsung, TSG-RAN WG1 #35, Lisbon, Portugal, Nov. 17-21, 2003, R1-031229 (6 pages total).

* cited by examiner

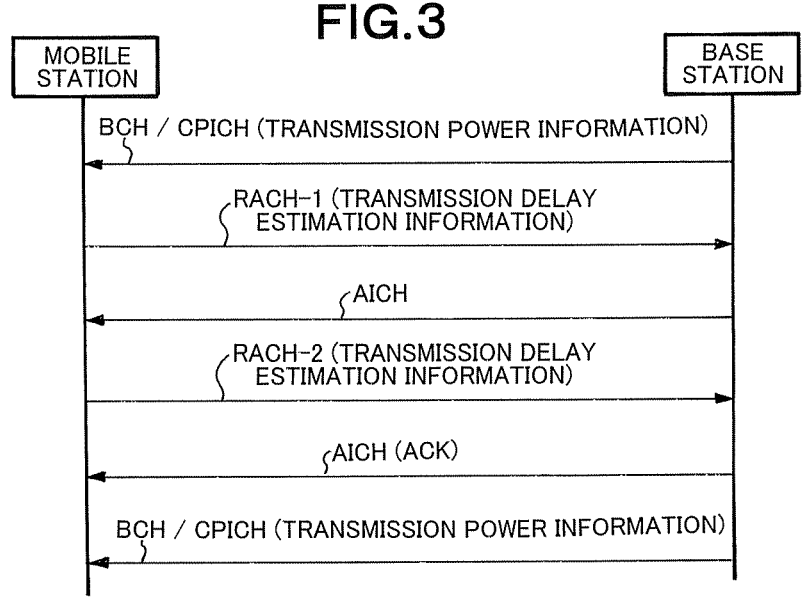
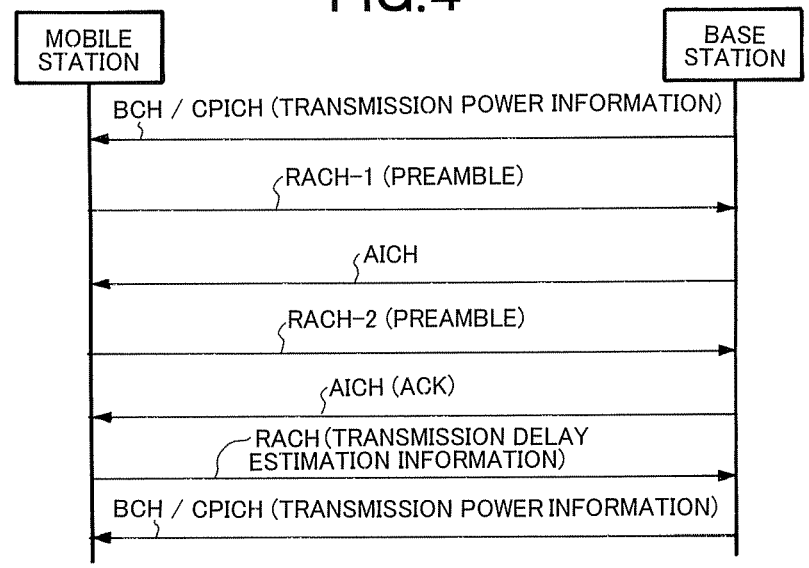

WIRELESS COMMUNICATION SYSTEM AND METHOD OF CONTROLLING A TRANSMISSION POWER

CROSS-REFERENCE TO RELATED APPLICATIONS

This application is a Continuation Application of U.S. application Ser. No. 15/138,308 filed Apr. 26, 2016, which is a Continuation Application of U.S. application Ser. No. 13/943,950, filed Jul. 17, 2013, issued as U.S. Pat. No. 9,369,968 on Jun. 14, 2016, which is a Continuation Application of U.S. application Ser. No. 12/092,002 filed Apr. 29, 2008, issued as U.S. Pat. No. 8,515,480 on Aug. 20, 2013, which is 371 of International Application No. PCT/JP2006/321981 filed Nov. 2, 2006, which claims priority from Japanese Patent Application No. 2005-321543 filed Nov. 4, 2005, the contents of all of which are incorporated herein by reference in their entirety.

TECHNICAL FIELD

The present invention relates to a transmission power control method for a wireless communication system transmitting data with wireless resources shared among a plurality of mobile stations.

BACKGROUND ART

In a W-CDMA system, random access channels (RACHs) using Slotted ALOHA are present (see, for example, Non-Patent Document 1). A RACH is a channel for transmitting not wireless resources specific to and allocated to each mobile station but common wireless resources (a frequency band, a scrambling code, and time) shared among mobile stations in one cell. The RACH is a channel used to transmit signals that are relatively small in size and that are not transmitted continuously such as a control signal for notifying of a periodic measurement result or a control signal for requesting start of a data communication.

The RACH is constituted by two parts called a "preamble part" and a "message part", and transmitted using orthogonal bit sequences called "signatures" so that a plurality of mobile stations can simultaneously access the RACH. 16 types of signatures are prepared, and each of the mobile stations selects one from among these signatures at random and uses the selected signature for scrambling the preamble and selecting a spreading code of the message part. Accordingly, if the mobile stations accidentally select the same signature and start random accesses at the same timing, collision of the message parts occurs. However, if mobile stations select different signatures, message parts can be received. In the latter case, however, a desired signal for one of the mobile stations becomes an interference signal for the other mobile station. Therefore, if the mobile stations transmit signals at the same transmission power, a so-called near-far problem occurs. Namely, a mobile station located farther from the base station, that is, a mobile station having a greater propagation loss suffers a higher interference from the other mobile station and a power for a desired wave attenuates, resulting in a greater deterioration in a signal to interference ratio (SIR).

Considering the near-far problem, as shown in FIG. 1, an open loop transmission power control is performed using preamble parts so that transmission power is set to as small power as possible in a range in which an SIR of the message part from each mobile station satisfies a desired value at the base station. Specifically, the open loop transmission power control has the following procedures.

One mobile station transmits a preamble at a predetermined initial power value $P_{init}$ [dBm]. At this time, a value calculated by the following equation is set to the initial power value $P_{init}$ [dBm] (see, for example, Non-Patent Document 2).

$$P_{init} = P\_CPICH\_Tx \cdot CPICH\_RSCP + UL\_Interference + Constant\_Value \text{ [dBm]}.$$

In the equation, P_CPICH_Tx [dBm] is a transmission power of a common pilot signal (CPICH: Common Pilot Channel) transmitted from the base station. UL_Interference and Constant_Value [dB] are predetermined power offsets and notified to each mobile station in a cell by a broadcast channel or the like as system parameters common to the mobile stations in the cell. Further, CPICH_RSCP [dBm] is a reception power level of the CPICH measured by each mobile station in a predetermined cycle.

As can be seen, the $P_{init}$ is decided according to the CPICH_RSCH, thereby eliminating the influence of the difference in propagation loss as much as possible and setting a reception level constant at the base station among the mobile stations.

Generally, however, a radio wave is susceptible to fading fluctuation generated by not only distance attenuation and shadowing but also movement of the mobile station in multipath environment. The fading fluctuation varies according to a carrier frequency. Due to this, in a W-CDMA FDD system using different frequency bands between an uplink and a downlink, a propagation loss measured in a downlink CPICH does not always coincide with that measured in an uplink CPICH. Moreover, because of presence of a measurement delay in the CPICH_RSCH, the propagation loss during transmission of a preamble greatly differs from that during measurement of the CPICH_RSCP depending on the movement of the mobile station, fading-caused drop or the like. Furthermore, the predetermined constants UL_Interference and Constant_Value are often set lower than optimum levels so as to suppress uplink interference. Due to such factors, a preamble reception power is insufficient and the base station is often incapable of detecting the preamble.

If the base station can receive the preamble, the base station transmits an acquisition indicator signal related to the preamble by a downlink common control channel after passage of a predetermined time ΔTack from a preamble transmission timing. At this time, if the base station permits the mobile station transmitting the preamble to transmit a message part, the base station transmits ACK to the base station. If the base station does not permit the mobile station to transmit the message part for such reasons as excess of the number of mobile stations from which the base station receives message parts, the base station transmits NACK to the mobile station.

On the other hand, the mobile station receives the downlink common control channel after passage of the predetermined time ΔTack from the preamble transmission timing and receives the acquisition indicator signal indicating ACK, the mobile station transmits the message part to the base station at a predetermined message part transmission timing. If the mobile station receives the acquisition indicator signal indicating NACK, then the mobile station notifies a higher layer of reception of the NACK and finishes the random access.

Furthermore, if the mobile station cannot receive the acquisition indicator signal at the predetermined timing, this means that the base station cannot receive the preamble. Therefore, the mobile station retransmits the preamble to the base station after a predetermined time. At this time, the mobile station retransmits the preamble at a preamble transmission power $P_{pre+tx}(k+1)$ [dBm] that is a previous transmission power $P_{pre\_tx}(k)$ plus a preamble power increment step $\Delta P_p$ [dB], i.e., performs so-called Ramp-up, where k indicates the number of times of retransmission of the preamble (k is set to 0 (k=0) at initial transmission).

The mobile station repeats the above-stated operations until receiving the acquisition indicator signal or the number of times of retransmission reaches a maximum number of times of retransmission K designated as a system parameter.

Likewise, for an EUTRA (Evolved Universal Terrestrial Radio Access) system currently hotly debated in 3GPP, it is considered to introduce uplink random access channels (see, for example, Non-Patent Document 3).

In relation to the EUTRA system, a wireless access method based on FDMA (Frequency Division Multiple Access) has been mainly discussed and random access on the premise that only one mobile station transmits signals in one frequency band and the like are considered. In this case, differently from the case where a plurality of mobile stations are allowed to access one channel in the same frequency band, the near-far problem does not occur. Due to this, a fixed power value common to the mobile stations in one cell can be set to a transmission power of each mobile station. In this case, however, it is necessary to set the transmission power so that the channel from even a mobile station located at a cell end has a sufficiently high quality at the base station. In other words, the mobile stations located at places other than the cell end transmit signals at excessive transmission power. Such a state unfavorably and unnecessarily increases interference with the adjacent cells if two adjacent cells use the same frequency band. Moreover, this unfavorably and unnecessarily increases power consumption of the mobile stations. Therefore, in the EUTRA, similarly to the WCDMA, it is preferable to make power setting based on the CPICH reception measurement value so that a mobile station having a higher propagation loss has a higher transmission power. However, the EUTRA has a smaller demerit of causing each mobile station to transmit a signal at excessive power than the WCDMA by as much as absence of the near-far problem. Due to this, it is proposed to set the transmission power so as to be able to satisfy a desired quality from initial transmission and to reduce a transmission delay in the RACH without performing the so-called power Ramp-up of starting an initial power lower than the power that can satisfy the desired quality and of gradually increasing the power as done in the WCDMA.

[Non-Patent Document 1] 3GPP TS25.214 v6.6.0 (2005 June) 3rd Generation Partnership Project; Technical Specification Group Radio Access Network; Physical layer procedures (FDD) (Release 6)

[Non-Patent Document 2] 3GPP TS25.331 v6.6.0 (2005 June) 3rd Generation Partnership Project; Technical Specification Group Radio Access Network; Radio Resource Control (RRC); Protocol Specification (Release 6)

[Non-Patent Document 3] 3GPP TS25.814 v0.2.0 (2005 August) 3rd Generation Partnership Project; Technical Specification Group Radio Access Network; Physical Layer Aspects for Evolved UTRA (Release 7)

DISCLOSURE OF THE INVENTION

Problems to be Solved

However, the RACH transmission power control exerted in the WCDMA system or the EUTRA system stated above has the following problems.

Although the RACH transmission power is decided based on the value designated by the base station (the power offset during the open loop power control or the fixed power value common to one cell), it is difficult to set the value to an optimum value. The reason is as follows. Since the interference varies depending on the situation of the cell to which the mobile station belongs or that of the adjacent cell, the transmission power necessary to obtain a desired SIR at the base station differs according to the situation. Furthermore, since the data transmission starts under the initiative of each mobile station over the random access channel, the base station cannot recognize that one mobile station tries to transmit a RACH until the base station receives the RACH correctly. The difficulty is, therefore, that the transmission power cannot be adaptively controlled according to the situation of transmission of the RACH. If the RACH transmission power is not appropriately set, the following problems occur.

1. RACH Transmission Power is Too Low

The problems disadvantageously occur that the number of times of retransmission required until a RACH is correctly received increases, the transmission delay of the RACH increases, and that service quality degrades. If the power Ramp-up is not performed, in particular, the RACHs can be transmitted always at a constant power whether reception fails. Due to this, the RACH can be retransmitted only in a state of insufficient power, resulting in a situation in which the RACH cannot be correctly received even by as much as the maximum number of times of retransmission at worst and in communication failure.

2. RACH Transmission Power is Too High

The problem occurs that an interference of one mobile station with an adjacent cell or the other users (in case of the WCDMA) in the cell to which the mobile station belongs increases. Besides, there is a problem of an increase in power consumption of each mobile station.

It is, therefore, an object of the present invention to provide a transmission power control method for a wireless communication system that enables a base station to appropriately set a power of a RACH that is common wireless resources according to a situation in the cell.

Means for Solving the Problems

To solve the problem, the present invention provides a method of controlling a transmission power, causing a base station to control a transmission power of a mobile station, comprising: causing the base station to notify of transmission power information on a RACH of an uplink; causing the mobile station to transmit transmission delay estimation information on the RACH at transmission power set based on the transmission power information over the RACH; and causing the base station to change the transmission power information on the RACH according to the transmission delay estimation information, and to notify the mobile station of the changed transmission power information on the wireless channel. Furthermore, the mobile station to retransmit data or a preamble after a predetermined time since transmitting the data or the preamble over the RACH if the mobile station does not receive an ACK which is a notification of which the base station has received the transmitted data or preamble correctly.

The mobile station notifies of the number of the transmission or the retransmission of the data or the preamble, a time elapsed since initial transmission of the data or the preamble or a timing of initial transmission of the data or the preamble by the transmission delay estimation information.

The mobile station retransmits the data or the preamble at a transmission power increased by a predetermined increase step if the mobile station does not receive the acquisition indicator information. The base station increases the transmission power of the RACH if a statistic value based on the transmission delay estimation information is greater than a predetermined target value.

The mobile station decides the transmission power of the RACH according to a reception power of a pilot signal transmitted from the base station. Further, the mobile station resets the transmission delay estimation information if the mobile station receives the acquisition indicator information.

By executing the above-stated sequence steps, the base station can appropriately set the RACH power according to a situation in the cell.

Advantages of the Invention

According to the present invention, the base station can appropriate set the RACH power. It is also possible to reduce the transmission delay of the RACH. It is also possible to reduce the interference of a mobile station with the other cell or with the other users in the cell to which the mobile station belongs. Due to this, throughput and capacity of the entire system can be improved.

BRIEF DESCRIPTION OF THE DRAWINGS

FIG. 3 is a sequence diagram of the system according to the present invention.

FIG. 4 is a sequence diagram of the system according to the present invention.

Figure 1:
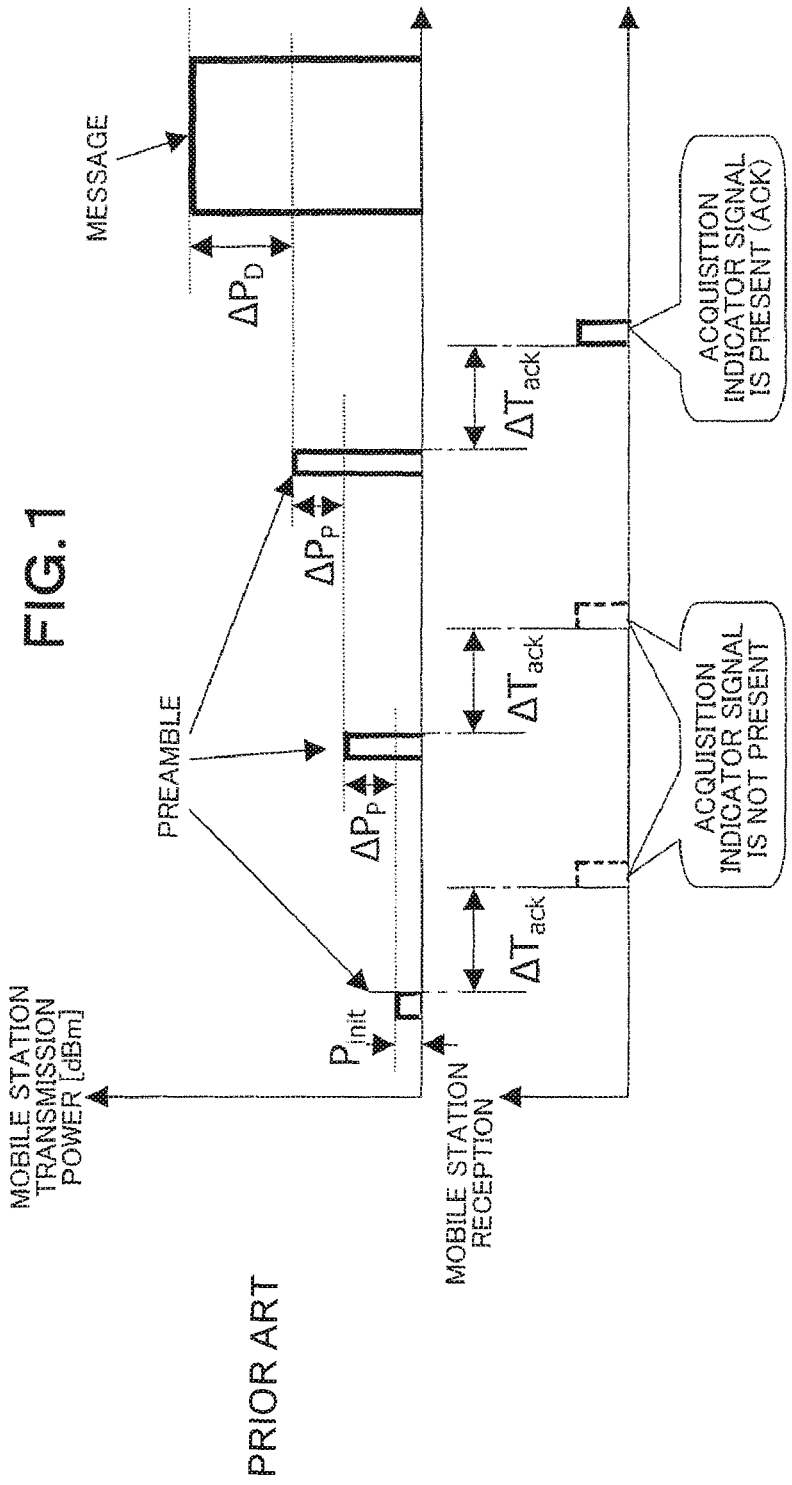
FIG. 1 is an explanatory diagram of an open loop transmission power control.

DESCRIPTION OF REFERENCE SYMBOLS 11 reception processing unit
12 signal separation unit
13 pilot signal measurement unit
14 power calculation unit
15 acquisition indicator signal determination unit
16 number-of-transmission measurement unit
17 buffer
18 signal combining unit
19 transmission processing unit
20 preamble generation unit
21 reception processing unit
22 decoding unit
23 error determination unit
24 signal separation unit
25 number-of-transmission calculation unit
26 power offset control unit
27 control signal generation unit
28 signal combining unit
29 transmission processing unit

BEST MODE FOR CARRYING OUT THE INVENTION

Most preferred embodiments of the present invention will be described hereinafter with reference to the drawings. The embodiments will be described assuming that a system is an E-UTRA system now under consideration in the 3GPP.

Figure 2:
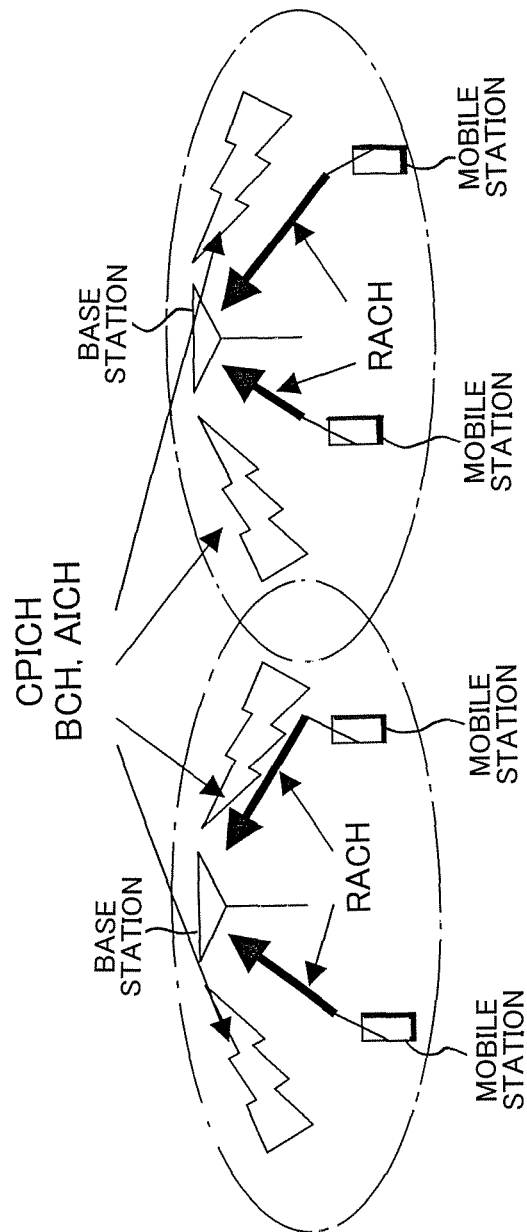
FIG. 2 is a conceptual diagram of a system according to the present invention.

FIG. 2 is a conceptual diagram of a system to which the present invention is applied. In the system, a plurality of base stations are present adjacently to one another, a plurality of mobile stations transmit or receive data on a downlink or an uplink to or from each of the base stations, OFDM (Orthogonal Frequency Division Multiple Access) is used for the downlink, and FDMA is used for the uplink. Furthermore, each of the mobile stations and base stations realizes functions to be described below by a control program stored in a memory of each of the mobile stations and base stations.

Each base station transmits on the downlink at least:

a broadcast channel (BCH) for transmitting broadcast information such as system information, a common pilot channel (CPICH) for transmitting a pilot signal, and an acquisition indicator channel (AICH) for transmitting acquisition indicator information in response to uplink data transmission.

FIG. 3 is a sequence diagram of the system. One mobile station transmits or receives data based on the system information transmitted over the BCH. Further, the mobile station receives the CPICH in a predetermined cycle to ensure synchronization and measures a reception quality of the CPICH. Moreover, if user data or a control signal (hereinafter, generically "data") to be transmitted occurs to the mobile station, the mobile station transmits the data using a random access channel (RACH) that is one of uplink wireless channels. This corresponds to transmission of the message part in the RACH transmission described in the "BACKGROUND ART" part. A RACH transmission power at this time is decided based on a value indicated by the base station using the BCH.

If the mobile station transmits the data over the RACH, the mobile station receives an acquisition indicator signal over the AICH after a predetermined time. The mobile station retransmits data at a predetermined timing until the mobile station receives an acquisition indicator signal (ACK signal) indicating that the data transmitted from the mobile station has been correctly received or until the number of times of retransmission reaches a predetermined maximum number of times of retransmission.

FIG. 4 shows another exemplary sequence of the system. FIG. 4 differs from FIG. 3 in the following respect. Similarly to the "BACKGROUND ART" part described above, if data to be transmitted occurs to the mobile station, the mobile station transmits a preamble over the RACH first. If the base station correctly receives the preamble, the base station transmits an acquisition indicator signal (ACK signal) over the AICH after a predetermined time. After receiving the acquisition indicator signal over the AICH, the mobile station transmits data or the preamble. It is to be noted that the preamble is a bit pattern known to the base station, and that a signal unknown to the base station such as user data or a control signal is not transmitted as the preamble.

In each of these sequences, the mobile station also transmits transmission delay estimation information while adding the transmission delay estimation information to the data or the preamble over the RACH. By doing so, the base station can control information on the RACH transmission power indicated by the BCH so that a delay required until the data or preamble is correctly received can be controlled to an appropriate value. It is possible to reduce interference by setting the transmission power of the mobile station as low as possible while effectively reducing the data transmission delay.

First Embodiment

Features of a first embodiment are as follows.
1. A mobile station transmits the number of times of retransmission or the number of times of transmission of the RACH as the transmission delay estimation information. In this case, the relationship between the number of times of retransmission and the number of times of transmission is (the number of times of retransmission)=(the number of times of transmission)−1. Embodiments will be described hereinafter assuming that the number of times is the number of times of transmission.
2. A base station notifies of a power offset as information on a RACH transmission power, and the mobile station decides the RACH power based on a CPICH reception power and the power offset (open loop power control).
3. The mobile station retransmits data at the same power as that used during data transmission.
4. The mobile station transmits data while adding the transmission delay estimation information to the data during the data transmission shown in FIG. 3. First to sixth embodiments will be described while referring to the system shown in FIG. 3.

By the above-stated features, the base station can determine whether the average number of times of transmission until each of the mobile stations in the system can correctly receive data over the RACH is kept to a desired level. If the average number of times of transmission is large, the power offset of the RACH can be controlled to be increased so as to reduce the transmission delay.

Figure 5:
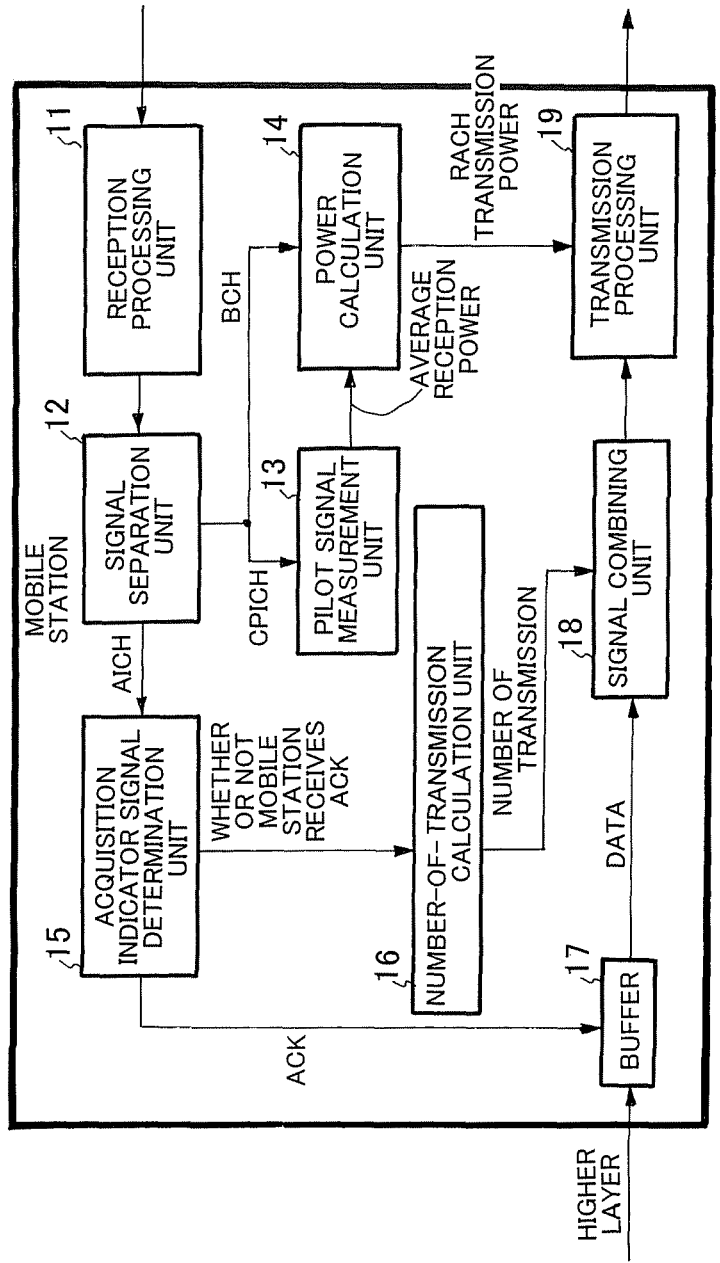
FIG. 5 is a configuration diagram of a mobile station according to a first embodiment.

FIG. 5 shows a configuration of each of the mobile stations according to the first embodiment. The mobile station according to the first embodiment is configured to include a reception processing unit 11 receiving a downlink signal and performing a necessary reception processing such as FET (Fast Fourier Transform), a signal separation unit 12 separating signals in respective channels from the received signal, a pilot signal measurement unit 13 measuring a power intensity of a separated pilot signal, a power calculation unit 14 calculating a power of the RACH, an acquisition indicator signal determination unit 15 determining an acquisition indicator signal received over an AICH, a number-of-transmission calculation unit 16 counting the number of times of transmission of the RACH, a buffer 17, a signal combining unit 18 combining uplink data with a control signal, and a transmission processing unit 19 performing a processing necessary for signal transmission.

The signal separation unit 12 separates signals in respective channels from the signal subjected to the reception processing. The signal separation unit 12 transmits a CPICH signal to the pilot signal measurement unit 13, an AICH signal to the acquisition indicator signal determination unit 15, and a BCH signal to the power calculation unit 14.

The pilot signal measurement unit 13 measures a pilot signal average reception power in a predetermined cycle and transmits the measured average reception power to the power calculation unit.

The power calculation unit 14 calculates a RACH transmission power P_Tx from a CPICH transmission power CPICH_Tx notified by the BCH, a power offset PO, and the pilot signal average reception power CPICH_Rx, and notifies the transmission processing unit 19 of the calculated RACH transmission power P_Tx.

The acquisition indicator signal determination unit 15 determines whether an ACK signal is received as the acquisition indicator information, and notifies the number-of-transmission calculation unit 16 and the buffer 17 of a determination result.

If the mobile station receives the ACK signal, the number-of-transmission calculation unit 16 resets the number of times of transmission to 0. If the mobile station does not receive the ACK signal, the number-of-transmission calculation unit 16 increases the number of times of transmission by 1 and notifies the signal combining unit 18 of the increased number of times of transmission.

If the mobile station receives the ACK signal, the buffer 17 abandons the relevant data. If the mobile station does not receive the ACK signal, the buffer 17 transmits the relevant data to the signal combining unit 18.

The signal combining unit 18 combines the data transmitted from the buffer with the number-of-transmission information, and transmits the resultant data to the transmission processing unit 19.

Figure 6:
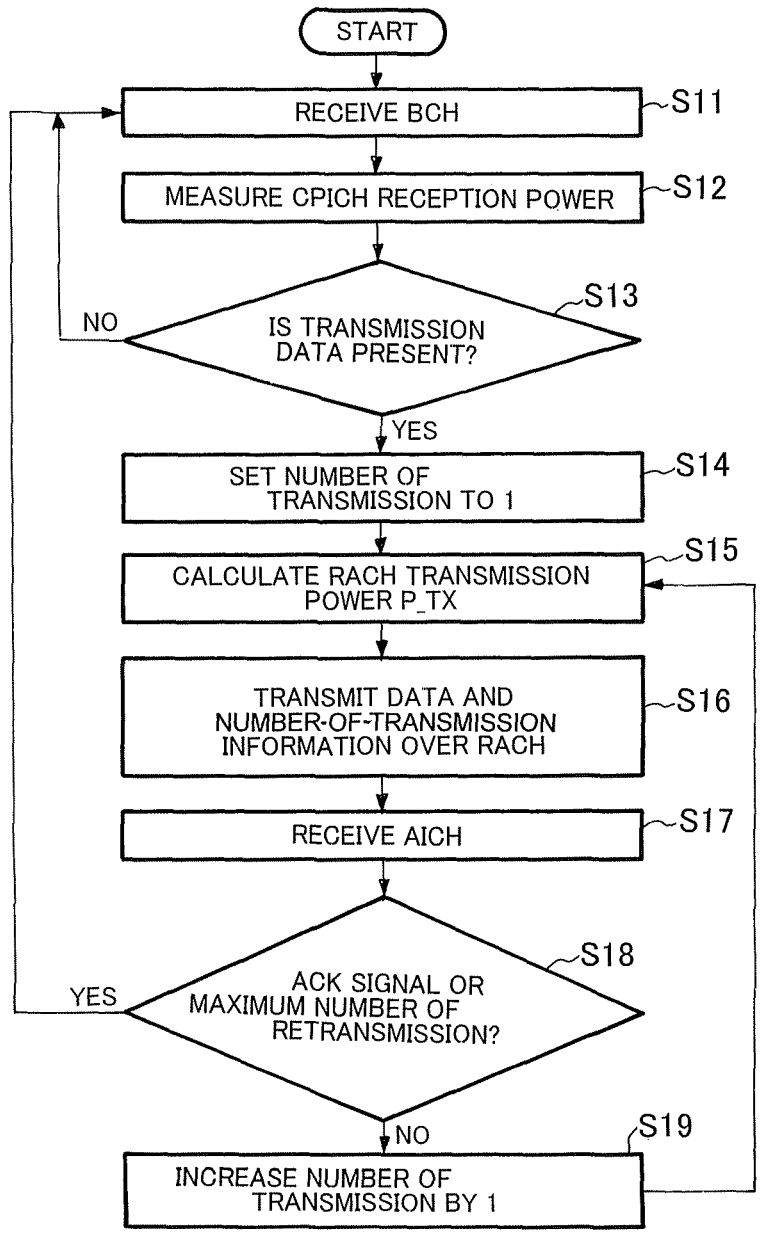
FIG. 6 is a flowchart of the mobile station according to the first embodiment.

FIG. 6 is a flowchart if the mobile station transmits data using the RACH according to the first embodiment.

The reception processing unit of the mobile station receives the BCH (step 11), and receives the CPICH transmission power CPICH_Tx, the power offset PO, the maximum number of times of transmission and the like transmitted as the system information. The pilot reception power measurement unit measures the pilot signal average reception power CPICH_Rx in the predetermined cycle (step 12). If transmission data is stored in the buffer (step 13), the number-of-transmission calculation unit sets the number-of-transmission information to 1 (step 14), calculates the RACH transmission power P_Tx (step 15), and transmits the number-of-transmission information as well as the data over the RACH (step 16). At this time, the power calculation unit calculates the RACH transmission power P_Tx according to the following equation.

$$P\_Tx = CPICH\_Tx - CPICH\_Rx + PO\,[\mathrm{dBm}]$$

After the predetermined time, the mobile station receives the downlink AICH (step 17). If the mobile station receives the ACK signal as the acquisition indicator information, the processing is returned to the step 11 (step 18; YES). If the mobile station does not receive the ACK signal, then the number-of-transmission calculation unit increase the number-of-transmission information by 1 (step 19), the processing is returned to the step 15, and the mobile station transmits the same data as the data transmitted previously. The mobile station repeats the operations until the mobile station receives the ACK signal over the AICH transmitted after the predetermined time since data transmission or until the number of times of transmission reaches the predetermined maximum number of times of transmission.

Figure 7:
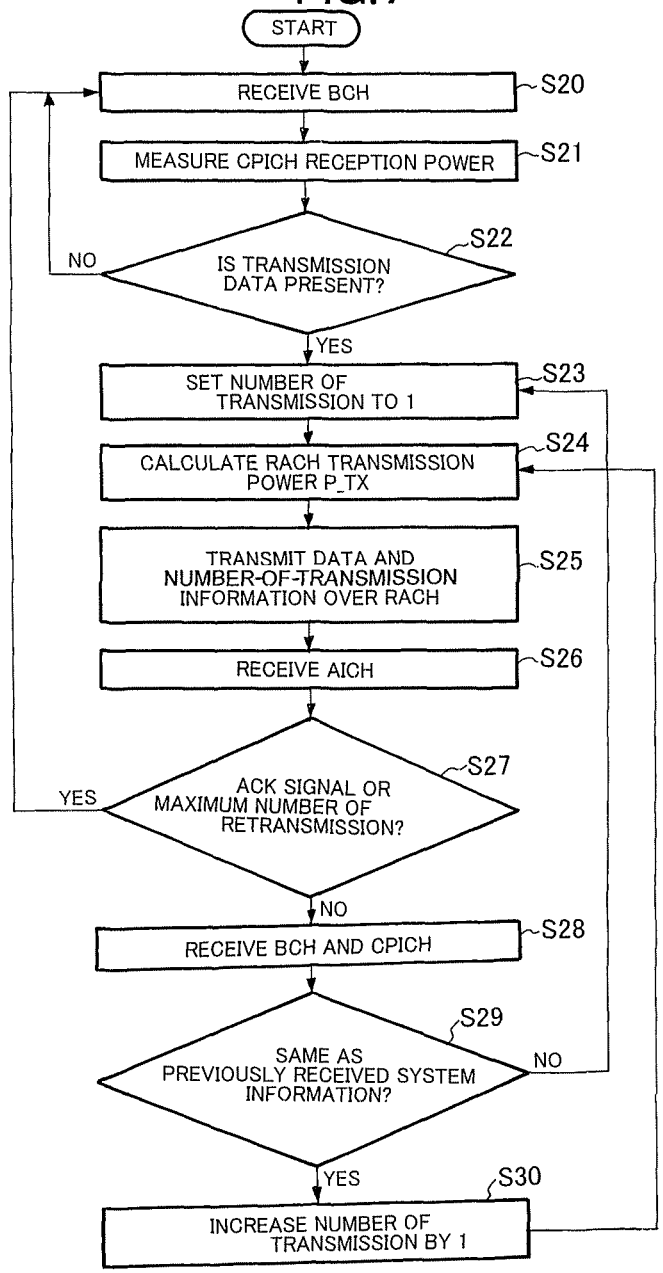
FIG. 7 is a flowchart of the mobile station according to the first embodiment.

FIG. 7 shows another example of the data transmission control exercise by the mobile station using the RACH.

The reception processing unit of the mobile station receives the BCH (step 20), and receives the CPICH transmission power CPICH_Tx, the power offset PO, the maximum number of times of transmission and the like transmitted as the system information. The pilot reception power measurement unit measures the pilot signal average reception power CPICH_Rx in the predetermined cycle (step 21). If transmission data is stored in the buffer (step 22), the number-of-transmission calculation unit sets the number-of-transmission information to 1 (step 23), calculates the RACH transmission power P_Tx (step 24), and transmits the number-of-transmission information as well as the data using the RACH (step 25).

After the predetermined time, the mobile station receives the downlink AICH (step 26). If the mobile station receives the ACK signal as the acquisition indicator information, the processing is returned to the step 20 (step 27; YES). If the mobile station does not receive the ACK signal, the mobile station receives the BCH and CPICH again (step 28). If system information is the same as the previously received system information (step 29; YES), then the number-of-transmission calculation unit increase the number-of-transmission information by 1 (step 30), the processing is returned to the step 24, and the mobile station transmits the same data as the data transmitted previously. Thereafter, the mobile station receives the system information over the BCH. If a value of each of or one of the CPICH transmission power and the power offset included in the system information differs from the previous value (step 29; NO), the processing is returned to the step 23, where the number-of-transmission calculation unit sets the number-of-transmission information to 1, and the mobile station transmits newly received data. The mobile station repeats the operations until the mobile station receives the ACK signal over the AICH transmitted after the predetermined time since data transmission or until the number of times of transmission reaches the predetermined maximum number of times of transmission.

Figure 8:
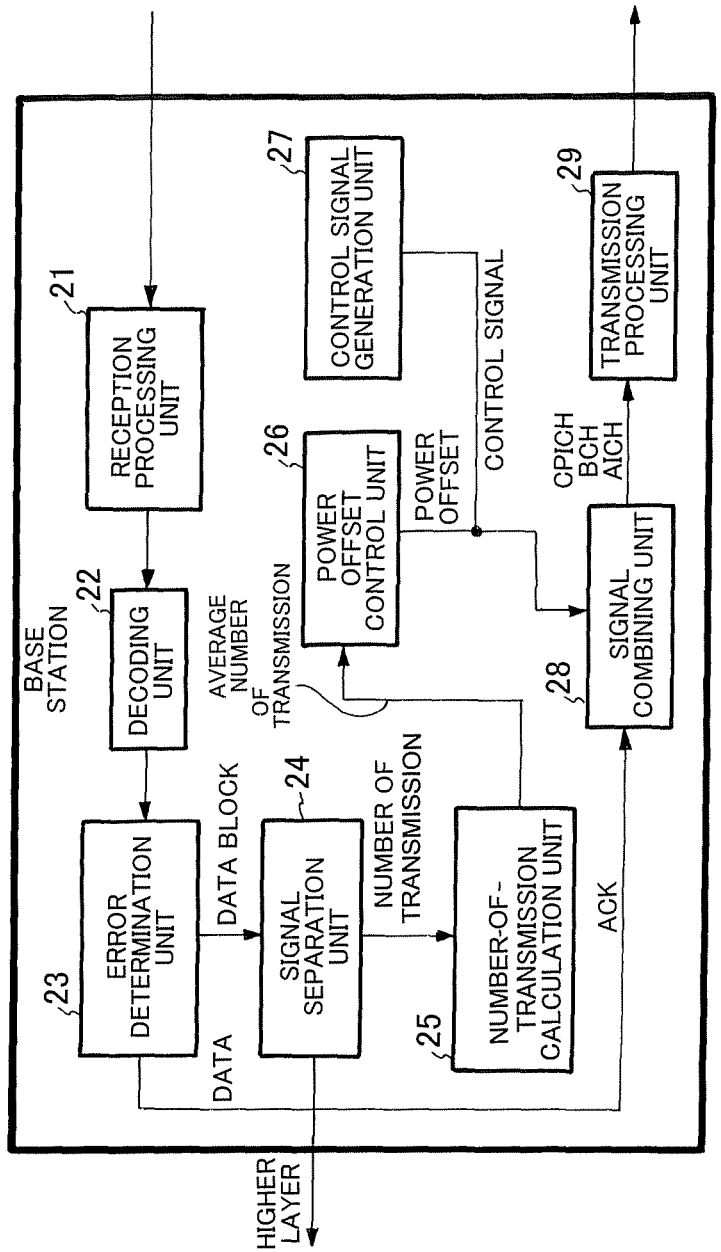
FIG. 8 is a configuration diagram of a base station according to the first embodiment.

FIG. 8 shows a configuration of each of the base stations used in the first embodiment. The base station used in the first embodiment is configured to include a reception processing unit 21, a decoding unit 22, an error determination unit 23, a signal separation unit 24 separating a signal, a number-of-transmission calculation unit 25, a power offset control unit 26, a control signal generation unit 27, a signal combining unit 28, and a transmission processing unit 29.

The error determination unit 23 checks whether a data block including the data and the number-of-transmission information has no error by a CRC added to the data block. If the base station can receive the data block without an error, the error determination unit 23 transmits the ACK signal to the signal combining unit 28 and the data block to the signal separation unit 24.

The signal separation unit 24 transmits the number-of-transmission information to the number-of-transmission calculation unit 25, and the data to a higher layer.

The number-of-transmission calculation unit 25 collects the number-of-transmission information on the respective base stations and records the information in a memory (not shown). Further, the number-of-transmission calculation unit 25 calculates an average value of the number of times of transmission (hereinafter, "average number of times of transmission) recorded in the memory at a predetermined power offset update timing, transmits a calculation result to the power offset control unit 26, and erases the number-of-transmission information recorded in the memory.

The power offset control unit 26 updates the power offset so that the average number of times of transmission nears a desired target average number of times of transmission, and transmits an update result to the signal combining unit 28.

The control signal generation unit 27 generates the common pilot signal and signals related to other system control information, and transmits the generated signals to the signal combining unit 28.

The signal combining unit 28 maps the transmitted signals on respective channels of the CPICH, the BCH, and the AICH, combines the signals, and transmits the combined signal to the transmission processing unit 29.

Figure 9:
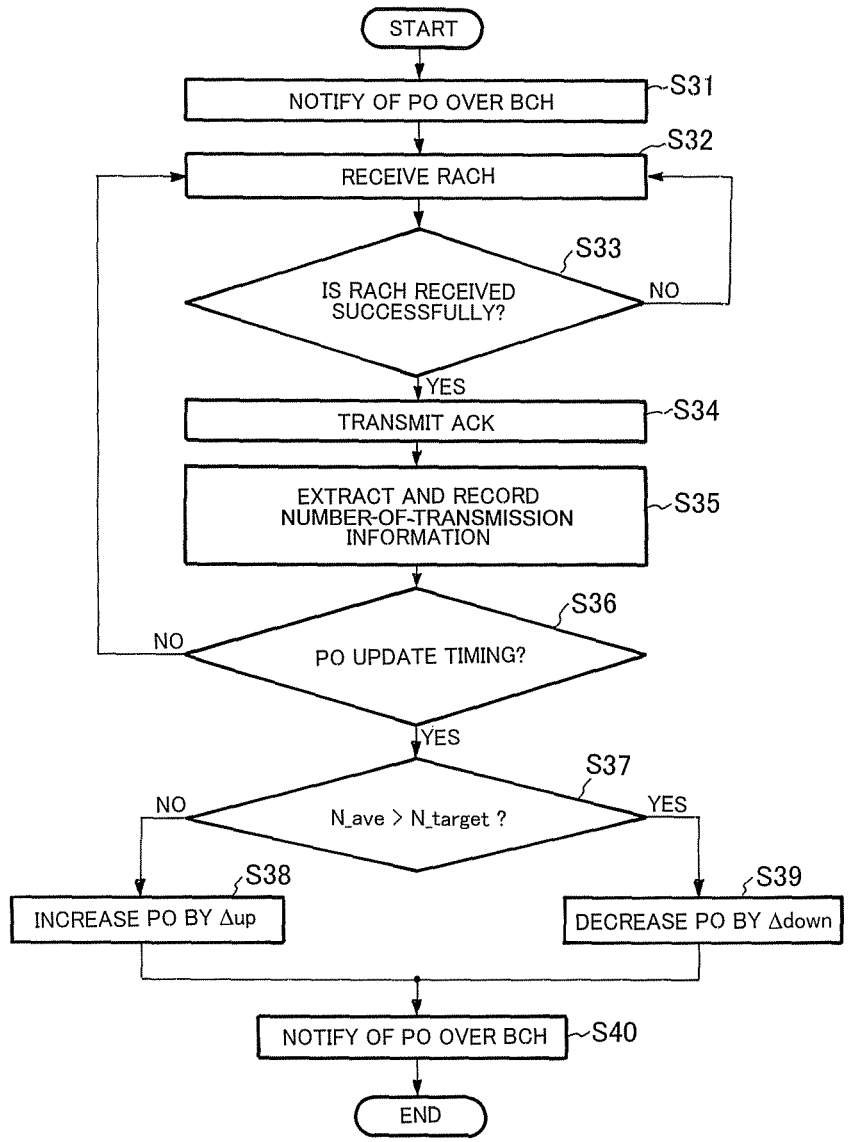
FIG. 9 is a flowchart of the base station according to the first embodiment.

FIG. 9 is a flowchart if the base station updates the power offset according to the first embodiment.

The base station notifies of the power offset as the system information in a predetermined cycle over the BCH (step 31), receives an uplink RACH (step 32), and checks whether the uplink RACH is received successfully by the CRC after a reception processing (step 33). If the reception succeeds, the base station transmits the ACK signal over the AICH (step 34). Further, the base station extracts the number-of-transmission information from the successfully received data block and records the number-of-transmission information in the memory (step 35). If timing is the predetermined power offset update timing (step 36), the base station calculates the average value of the number of times of transmission of the mobile stations in one cell extracted so far (step 37), and updates the power offset so that the average number of times of transmission nears the desired target average number of times of transmission.

Assuming, for example, that the average number of times of transmission is N_ave, the target number of times of transmission is N_target, the current power offset is PO_current, the updated power offset is PO_update, a power offset increase step is Δup(Ramp-up), and a power offset decrease step is Δdown(Ramp-down), the following relationships are held.

If N_ave>N_target,
PO_update=PO_current+Δup [dB] (step 38).
If N_ave<N_target,
PO_update=PO_current·Δdown [dB] (step 39).

It is assumed herein that the relationship of Δup and Δdown is Δup>Δdown.

The base station notifies each base station in the cell of the updated PO over the BCH (step 40).

In this manner, if the average number of times of transmission is greater than the predetermined target number, the power offset can be increased. Accordingly, the RACH transmission power of each mobile station in the cell is set high and the reception quality of the RACH at the base station is improved. It is, therefore, possible to reduce the number of times of transmission before the RACH is received successfully, and reduce the transmission delay. Moreover, if the average number of times of transmission is smaller than the predetermined target number, that is, the RACH is transmitted at excessive quality, the power offset can be reduced. Accordingly, the RACH transmission power of each mobile station in the cell is set high and the interference with the other cells can be reduced.

As stated so far, according to the first embodiment, each mobile station notifies the base station of the number-of-transmission information as well as the RACH at the time of transmission of the RACH. Accordingly, if the average number of times of transmission is greater than the predetermined target value, that is, a delay before the data is received correctly over the RACH is great, then the power offset is increased so as to set the RACH transmission power high and each mobile station in the cell can be notified of the increased power offset. By doing so, the RACH transmission power of each mobile station in the cell increases and the probability that the base station can correctly receive data increases, so that the average number of times of transmission decreases and the RACH transmission delay can be reduced.

If the average number of times of transmission is smaller than the predetermined target value, this means that each mobile station transmits the RACH at excessive quality. Due to this, the power offset is decreased so that the RACH transmission power is set low, and each mobile station in the cell can be notified of the decreased power offset. It is, therefore, possible to reduce the RACH transmission power, reduce the interference with the other cells, and reduce the power consumption of each mobile station.

Furthermore, according to the first embodiment, the power offset increase step and the power offset decrease step are set asymmetric so that the power offset increase step is greater than the power offset decrease step. By so setting, if the delay is great, the power can be promptly increased. Since the subsequent reduction is made gradually, it takes longer time until the delay becomes greater (that is, the average number of times of transmission is greater than the target number of times of transmission). A target delay can be, therefore, stably satisfied. However, embodiments of the present invention are not limited to the first embodiment. Namely, the power offset increase step and the power offset decrease step may be set to an identical value, and the decrease step may be set greater than the increase step.

Second Embodiment

A second embodiment differs from the first embodiment in the following respects. Each of the base stations also notifies a RACH power increase step ΔP over the BCH. Each of the mobile stations receives information on the power increase step ΔP as well as the CPICH transmission power CPICH_Tx and the power offset PO over the BCH, calculates the RACH transmission power P_Tx according to the following equation, and retransmits the RACH with a power increased from the previous power by ΔP [dB].

$$P\_Tx = CPICH\_Tx \cdot CPICH\_Rx + PO + \Delta P \times ((\text{number of times of transmission})-1) \text{ [dBm]}$$

If the number of times of retransmission is used, ((number of times of transmission)−1) is replaced by ((number of times of retransmission)−1).

At this time, if the mobile station is to transmit new data over the RACH after receiving the ACK signal over the AICH, the mobile station transmits the new data with the power returned to initial power obtained from the power offset and the CPICH reception power. The other operations are similar to those according to the first embodiment.

Third Embodiment

A third embodiment differs from the first embodiment in the following respects. In the first embodiment, the RACH power value is decided based on the CPICH reception power and the power offset. In the third embodiment, each of the base stations notifies each mobile station of a fixed transmission power value P_Tx as system information, and each of the mobile stations in the cell transmits the RACH at P_Tx. The base station increases or decreases P_Tx by a predetermined step according to the number of times of transmission notified from the mobile station. Specifically, the base station calculates P_Tx as follows.

Assuming that the average number of times of transmission is N_ave, the target number of times of transmission is N_target, the current transmission power is P_Tx_current, the updated transmission power is P_Tx_update, a power increase step is Δup, and a power decrease step is Δdown, the following relationships are held.

If N_ave>N_target,
P_Tx_update=P_Tx_current+Δup [dB].
If N_ave<N_target,
P_Tx_update=P_Tx_current−Δdown [dB].

The P_Tx updated at the base station is notified to the mobile station as the system information over the BCH. The other operations are similar to those according to the first embodiment.

Fourth Embodiment

A fourth embodiment is a combination of the second and third embodiments. In the second embodiment, the RACH initial transmission power value is decided based on the CPICH reception power and the power offset. In the fourth embodiment, each of the base stations notifies each mobile station of the fixed transmission power value P_Tx as system information, and each of the mobile stations in the cell transmits an initial RACH at P_Tx. Thereafter, in case of retransmission, the mobile station retransmits the RACH at a power obtained by adding a predetermined power increase step ΔP to P_Tx. Furthermore, the base station increases or decreases the fixed transmission power value P_Tx by a predetermined step according to the number of times of transmission from the base station in the manner described in the first embodiment, and notifies the mobile station of the resultant transmission power as the system information over the BCH. The other operations are similar to those according to the first or second embodiment.

Fifth Embodiment

In a fifth embodiment, each of the mobile stations causes a timer to operate at time of initial RACH transmission, and notifies each of the mobile stations of a value of the timer during retransmission, that is, a time elapsed from start of RACH transmission as transmission delay estimation information.

Figure 10:
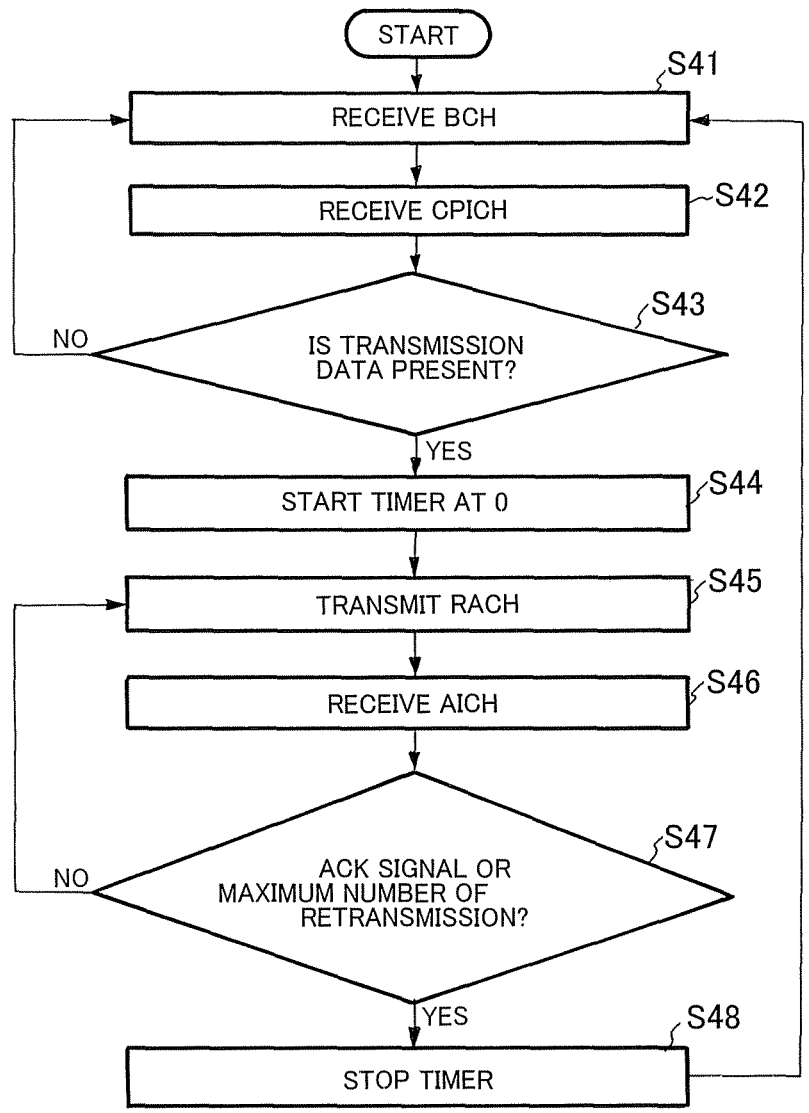
FIG. 10 is a flowchart of a mobile station according to a fifth embodiment.

FIG. 10 is a flowchart if each of the mobile stations transmits data using the RACH according to the fifth embodiment.

The mobile station receives the BCH (step 41), receives the CPICH transmission power CPICH_Tx, the power offset PO, the maximum number of times of transmission and the like transmitted as the system information, and measures the pilot signal average reception power CPICH_Rx in the predetermined cycle (step 42). If transmission data is present (step 43), the timer is started at 0 (step 44).

The mobile station transmits timer information as well as the data over the RACH at the transmission power P_Tx (step 45). After the predetermined time, the mobile station receives the downlink AICH (step 46). If the mobile station receives the ACK signal (step 47; YES), the timer is stopped (step 48), and the processing is returned to the step 41. If the mobile station does not receive the ACK signal, then the processing is returned to the step 45, and the mobile station retransmits the timer information as well as the data transmitted previously. The mobile station repeats the operations until the mobile station receives the ACK signal over the AICH transmitted after the predetermined time since data transmission or until the number of times of transmission reaches the predetermined maximum number of times of transmission.

Sixth Embodiment

In a sixth embodiment, using system time known to base stations and mobile stations, each mobile station notifies one base station of system time that is RACH transmission start time, and the base station calculates a transmission delay by subtracting system time that is the notified transmission start time from system time at which the RACH is received successfully.

Figure 11:
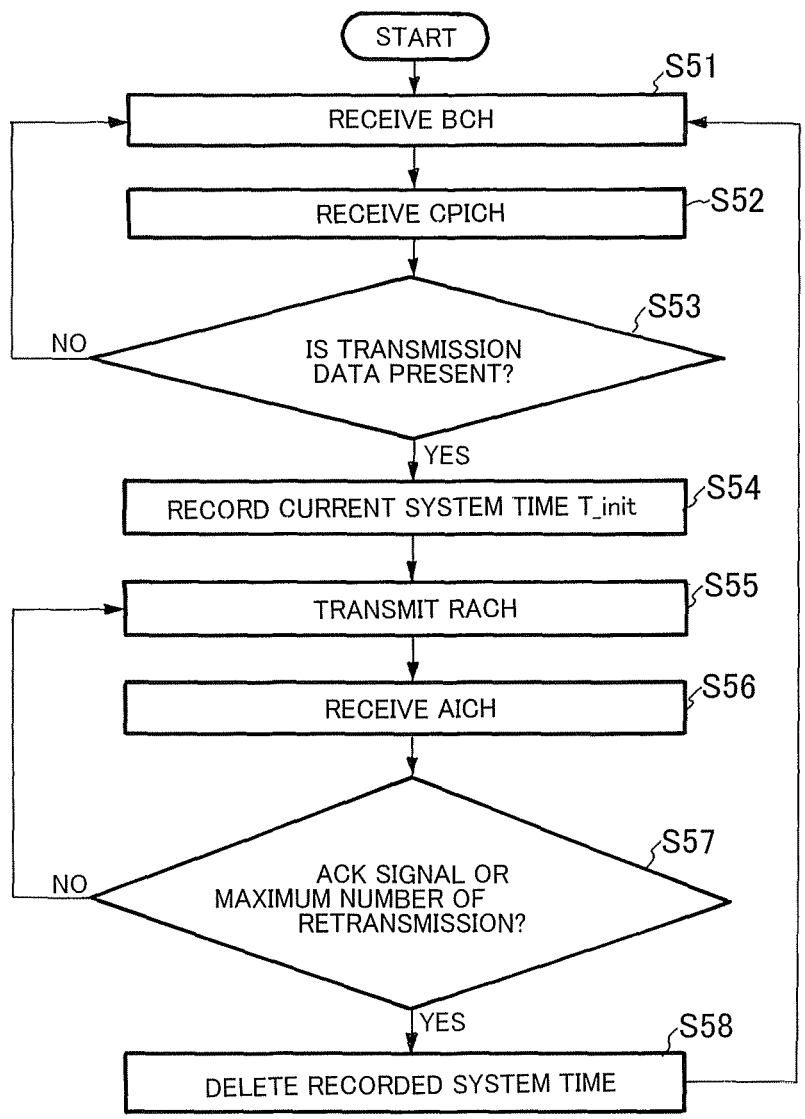
FIG. 11 is a flowchart of a mobile station according to a sixth embodiment.

FIG. 11 is a flowchart if each of the mobile stations transmits data using the RACH according to the sixth embodiment.

The mobile station receives the BCH (step 51), receives the CPICH transmission power CPICH_Tx, the power offset PO, the maximum number of times of transmission and the like transmitted as the system information, and measures the pilot signal average reception power CPICH_Rx in the predetermined cycle (step 52). If transmission data is present (step 53), current system time T_init is recorded (step 54).

The mobile station transmits system time as well as the data over the RACH at the transmission power P_Tx (step 55). After the predetermined time, the mobile station receives the downlink AICH (step 56). If the mobile station receives the ACK signal (step 57; YES), the recorded system time is deleted (step 58), and the processing is returned to the step 51. If the mobile station does not receive the ACK signal, the processing is returned to the step 55, and the mobile station retransmits the system as well as the data transmitted previously. The mobile station repeats the operations until the mobile station receives the ACK signal over the AICH transmitted after the predetermined time since data transmission or until the number of times of transmission reaches the predetermined maximum number of times of transmission.

Figure 12:
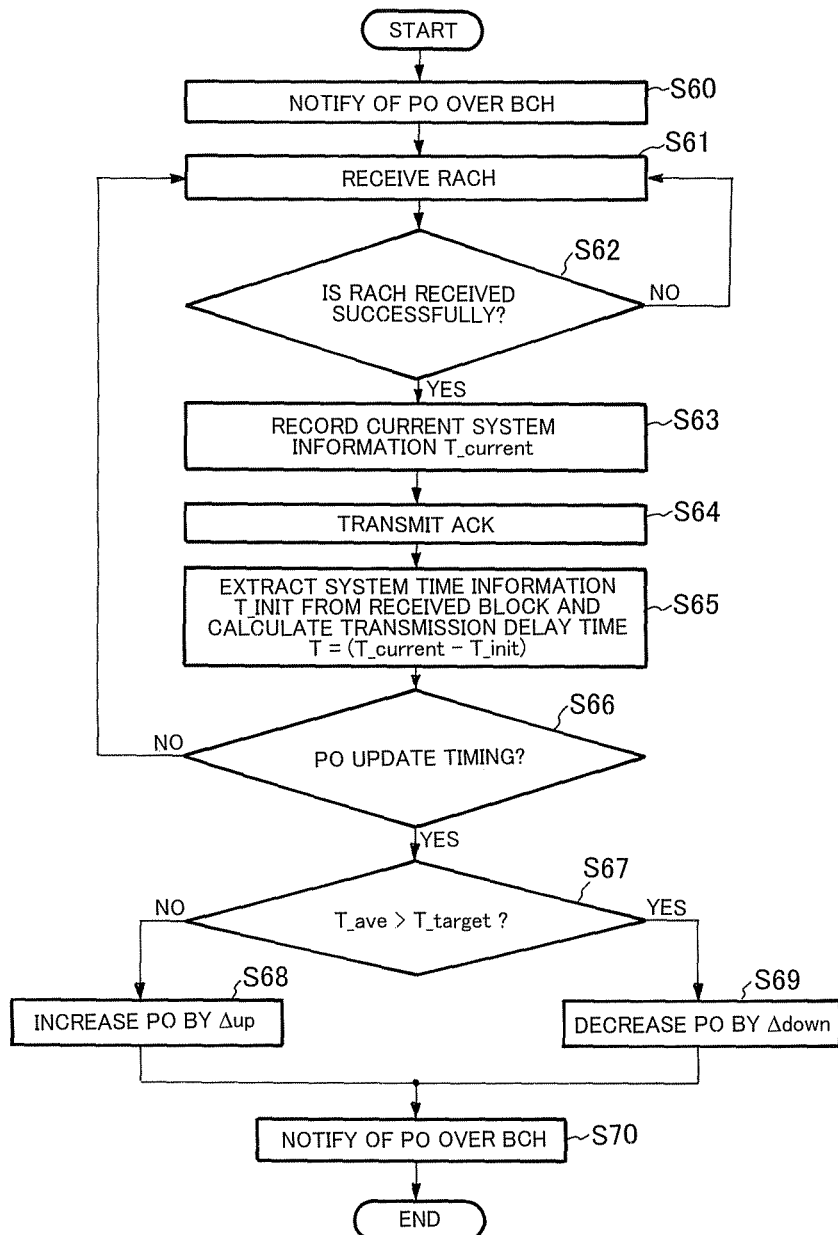
FIG. 12 is a flowchart of a base station according to the sixth embodiment.

FIG. 12 is a flowchart if the base station updates the power offset according to the sixth embodiment.

The base station notifies of the power offset as the system information in a predetermined cycle over the BCH (step 60), receives an uplink RACH (step 61), and checks whether the uplink RACH is received successfully by the CRC after a reception processing (step 62). If the reception succeeds, the base station records current system information T_current (step 63) and transmits the ACK signal over the AICH (step 64). Further, the base station extracts system time information T_init from the received block, calculates transmission delay time T=(T_current−T_init), and records the transmission delay time T=(T_current−T_init) in the memory (step 65). If timing is the predetermined power offset update timing (step 66), the base station updates the power offset based on the transmission delay time calculated and recorded so far. By way of example, the base station calculates average transmission delay time (step 67) and updates the power offset so that the average transmission delay time nears a desire target value.

Assuming, for example, that the average transmission delay time is T_ave, the target transmission delay time is T_target, the current power offset is PO_current, the updated power offset is PO_update, the power offset increase step is Δup, and the power offset decrease step is Δdown, the following relationships are held.

If T_ave>T_target,
PO_update=PO_current+Δup [dB] (step 68).
If T_ave<T_target,
PO_update=PO_current−Δdown [dB] (step 69).

It is assumed herein that the relationship of Δup and Δdown is Δup>Δdown.

The base station notifies each base station in the cell of the updated PO over the BCH (step 70).

Seventh Embodiment

A seventh embodiment is used in a system transmitting data using the message part after transmitting the preamble as described with reference to FIG. 4. Transmission delay estimation information is not transmitted using a preamble before reception of the ACK signal, but the transmission delay estimation information is transmitted when a preamble or data after reception of the ACK signal is transmitted with the transmission delay information added to the preamble or the data.

The operations according to the first to sixth embodiment can be applied to the other operations. In the seventh embodiment, the number of times of transmission of the preamble is used as the transmission delay information, and calculation of the RACH power is decide based on the CPICH transmission power, the CPICH reception power, the predetermined power offset, and the number of times of transmission as described in the second embodiment. For example, in FIG. 1, the message part is transmitted after the preamble is transmitted three times. Therefore, "(number of times of transmission)=3" is transmitted as the transmission delay information using the message part.

Figure 13:
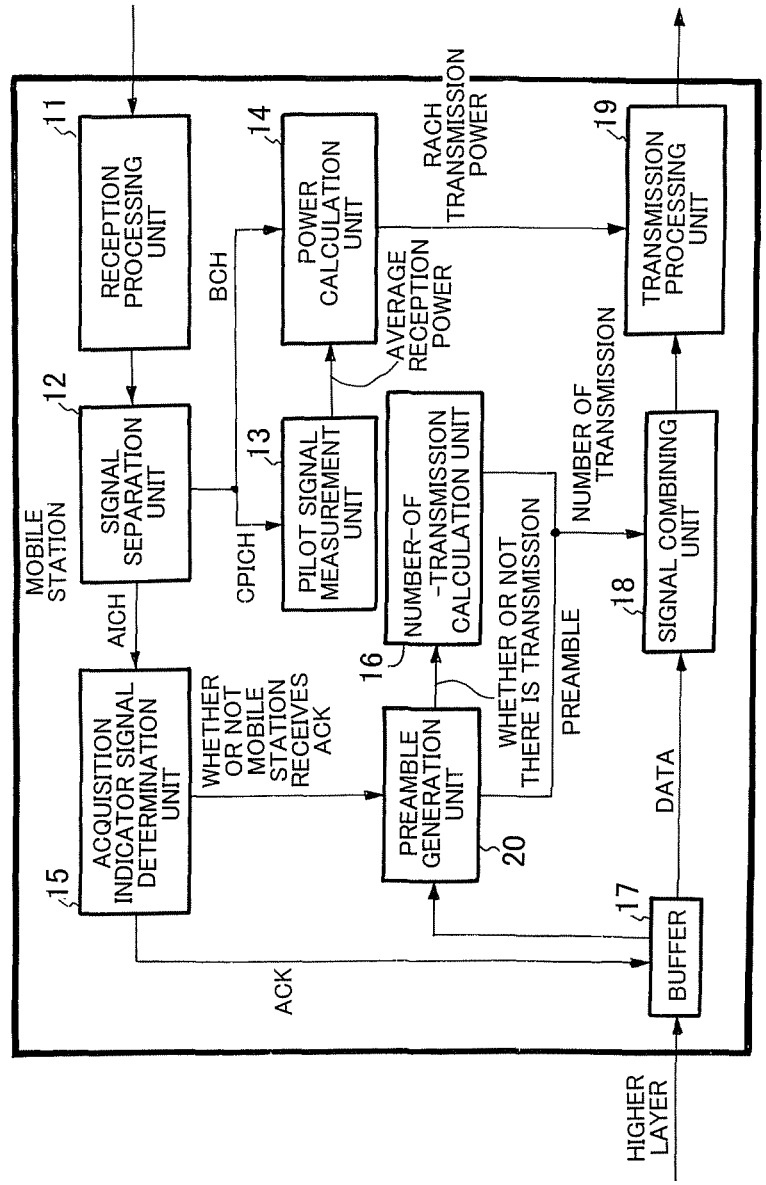
FIG. 13 is a configuration diagram of a mobile station according to a seventh embodiment.

FIG. 13 shows a configuration of each of the mobile stations according to the seventh embodiment. The configuration of the mobile station according to the seventh embodiment differs from that according to the first embodiment (FIG. 5) in that a preamble generation unit is additionally included in the mobile station.

If data arrives at the buffer, then the buffer notifies the preamble generation unit of data arrival, the preamble generation unit generates a predetermined bit sequence, transmits the generated bit sequence to the signal combining unit, and notifies the number-of-transmission measuring unit that the preamble is transmitted to the number-of-transmission measuring unit. The transmission processing unit performs a necessary processing on the generated bit sequence and then transmits the processed bit sequence as a preamble.

Furthermore, the acquisition indicator signal determining unit notifies the preamble generation unit whether or not the acquisition indicator signal determining unit receives the ACK signal over the AICH after predetermined time since transmission of the preamble.

If the acquisition indicator signal determining unit does not receive the ACK signal, the preamble generation unit generates the predetermined bit sequence and transmits the generated bit sequence as the preamble similarly to the above. Further, the preamble generation unit notifies the number-of-transmission measuring unit of transmission of the preamble. In response to the notification of the transmission of the preamble, the number-of-transmission measuring unit increases the recorded number of times by 1.

If the acquisition indicator signal determining unit receives the ACK signal, the preamble generation unit does not generate the preamble and notifies the number-of-transmission measuring unit that transmission of the preamble is stopped. In response to the notification of the stop of the transmission of the preamble, the number-of-transmission measuring unit transmits the recorded number of times of transmission to the signal combining unit as the number-of-transmission information. Further, the buffer is also notified that the acquisition indicator signal determining unit receives the ACK signal, and the buffer transmits a data block to the signal combining unit, accordingly.

The signal combining unit combines the data block with the number-of-transmission information, and the transmission processing unit performs a necessary processing on the number-of-transmission information and then transmits the processed information.

Figure 14:
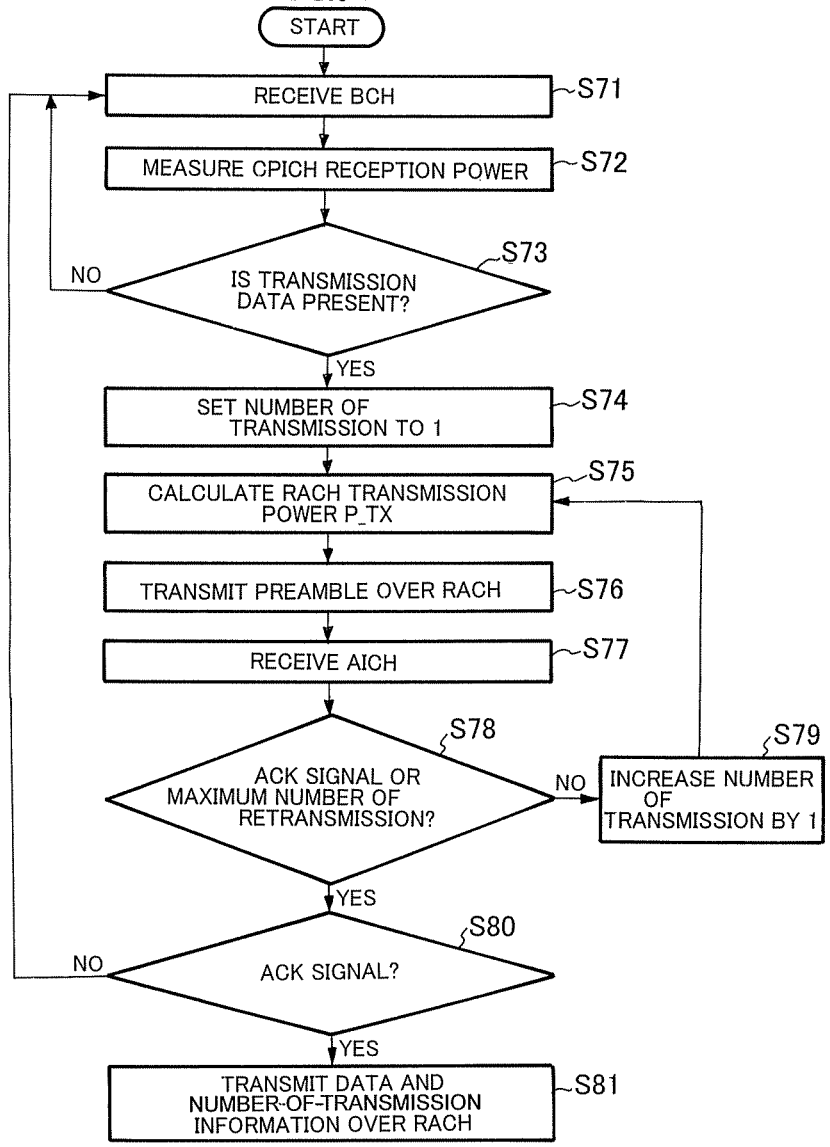
FIG. 14 is a flowchart of the mobile station according to the seventh embodiment.

FIG. 14 is a flowchart if each of the mobile stations transmits data using the RACH according to the seventh embodiment.

In the mobile station, the reception processing unit receives the BCH (step 71), and receives the CPICH transmission power CPICH_Tx, the power offset PO, the maximum number of times of transmission and the like transmitted as the system information. The pilot reception power measurement unit measures the pilot signal average reception power CPICH_Rx in the predetermined cycle (step 72). If transmission data is stored in the buffer (step 73), the number-of-transmission calculation unit sets the number-of-transmission information to 1 (step 74), calculates the RACH transmission power P_Tx (step 75), and transmits the preamble over the RACH (step 76). At this time, the power calculation unit calculates the RACH transmission power according to the following equation.

$$P\_Tx = CPICH\_Tx - CPICH\_Rx + PO + \Delta p \times ((\text{number of times of transmission}) - 1) \text{ [dBm]}$$

After the predetermined time, the mobile station receives the downlink AICH (step 77). If the mobile station receives the ACK signal as the acquisition indicator information (steps 78 and 80; YES), then the mobile station transmits the data and the number-of-transmission information over the RACH (step 81), and the processing is returned to the step 71. If the mobile station does not receive the ACK signal and the number of times of transmission is smaller than the maximum number of times of transmission (step 78; NO), then the number-of-transmission calculation unit increases the number-of-transmission information by 1 (step 79), and the processing is returned to the step 75. Furthermore, if the mobile station does not receive the ACK signal and the number of times of transmission reaches the maximum number of times of transmission (step 80; NO), the processing is returned to the step 71.

In the first to seventh embodiments stated above, data is transmitted using the RACH. However, the data is not limited to user data. For example, a resource reservation request signal for requesting allocation of uplink wireless resources for transmitting the user data may be transmitted using the RACH. Alternatively, the transmission of data using the RACH may be applied to an instance of transmitting a control signal necessary to transmit downlink data, e.g., a signal notifying of a quality of a downlink wireless channel (CQI: Channel Quality Indicator) or the like.

In the first to seventh embodiments stated above, the OFDM and the FDMA are used for the downlink and the uplink as the wireless access methods, respectively. However, the scope of the present invention is not limited to the usage. For example, the present invention may be applied to a system using the CDMA for both the uplink and the downlink similarly to the currently available WCDMA system, a system using the OFDM for both the uplink and the downlink, or the like.

In the first to seventh embodiments stated above, the random access channel is applied to the uplink wireless channel. However, the scope of the present invention is not limited to the application. Alternatively, the present invention is applicable to any wireless channels used for causing each base station to set transmission power information to each mobile station, and for causing the mobile station to transmit uplink data at arbitrary timing at a power set based on the designated transmission power information.

In the first to seventh embodiments stated above, the base station transmits the RACH transmission power information over the BCH as the system information. However, the scope of the present invention is not limited to the transmission method. For example, the base station may notify each of the mobile stations of the RACH transmission power information using an individual control signal.

Furthermore, in the first to seventh embodiments stated above, the base station sets only one transmission power information. However, the scope of the present invention is not limited to the setting. For example, the mobile stations in one cell are divided into a plurality of groups, and the base station may set different transmission power information to the respective groups. Namely, such a setting may be considered that the base station sets a higher RACH transmission power to a user group enjoying prioritized services than those set to the other ordinary user groups. In another alternative, the base station may set the RACH transmission power to different values according to contents of data transmitted from the respective mobile stations. Namely, different values may be set to the transmission power information in case of the above-stated Reservation Request and that in case of transmission of the user data, respectively.

Moreover, in the first to seventh embodiments stated above, the base station updates the RACH transmission power or the power offset according to the transmission delay estimation information. However, the scope of the present invention is not limited to the update method. The base station may update the transmission power or the power offset using the other information. For example, one of factors for increasing the transmission delay is as follows. Because of heavy RACH traffic (because of the larger number of mobile stations intended to transmit data over the RACH), a plurality of mobile stations transmit data or a preamble over the RACH at the same timing and a collision occurs. In such a case, since the insufficient RACH transmission power does not possibly cause an increase in the transmission delay, there is no need to increase the RACH transmission power or the power offset. In other words, the base station estimates the RACH traffic from the number of mobile stations successfully transmitting the data or preamble over the RACH in a predetermined time or the like. Only if the RACH traffic is equal to or smaller than a predetermined threshold, the base station may update the transmission power or the power offset based on the transmission delay estimation information as described in the first to seventh embodiments.

The invention claimed is:

1. A mobile station comprising:
  a receiver configured to receive first information from a base station; and
  a transmitter configured to:
    transmit, to the base station, a first RACH preamble based on the first information,
      wherein the first RACH preamble is transmitted without second information, the second information being related to a number of RACH preambles sent until a successful RACH completion; and transmit the second information to the base station, wherein the receiver is configured to receive third information from the base station, the third information being changed from the first information based on the second information, wherein the transmitter is configured to transmit, to the base station, a second RACH preamble based on the third information, and wherein the second RACH preamble is transmitted without fourth information, the fourth information being related to a number of RACH preambles sent until a successful RACH completion.

2. The mobile station according to claim 1, wherein the transmitter is configured to transmit the second information to the base station after transmitting the first RACH preamble.

3. The mobile station according to claim 1, wherein the receiver is configured to receive the third information after transmitting the second information.

4. The mobile station according to claim 1, wherein the transmitter is configured to transmit the second information to the base station after receiving a signal from the base station.

5. The mobile station according to claim 4, wherein the signal is a response to the first RACH preamble.

6. The mobile station according to claim 1, wherein the transmitter is configured to transmit the first RACH preamble with preamble transmission power, the preamble transmission power being determined by the mobile station using the first information.

7. The mobile station according to claim 1, wherein the transmitter is configured to transmit the second RACH preamble with preamble transmission power, the preamble transmission power being determined by the mobile station using the third information.

8. A method of a mobile station, the method comprising:
receiving first information from a base station;
transmitting, to the base station, a first RACH preamble based on the first information,
wherein the first RACH preamble is transmitted without second information, the second information being related to a number of RACH preambles sent until a successful RACH completion,
transmitting the second information to the base station;
receiving third information from the base station, the third information being changed from the first information based on the second information; and
transmitting, to the base station, a second RACH preamble based on the third information,
wherein the second RACH preamble is transmitted without fourth information, the fourth information being related to a number of RACH preambles sent until a successful RACH completion.

9. The method according to claim 8, wherein the second information is transmitted to the base station after transmitting the first RACH preamble.

10. The method according to claim 8, wherein the third information is received after transmitting the second information.

11. The method according to claim 8, wherein the second information is transmitted to the base station after receiving a signal from the base station.

12. The method according to claim 11, wherein the signal is a response to the first RACH preamble.

13. The method according to claim 8, wherein the first RACH preamble is transmitted with preamble transmission power, the preamble transmission power being determined by the mobile station using the first information.

14. The method according to claim 13, wherein the first information is related to initial preamble power.

15. The method according to claim 8, wherein the second RACH preamble is transmitted with preamble transmission power, the preamble transmission power being determined by the mobile station using the third information.

16. A base station comprising:
a transmitter configured to broadcast first information to a mobile station, the first information being configured for transmitting a first RACH preamble; and
a receiver configured to:
receive the first RACH preamble from the mobile station,
wherein the first RACH preamble is received without second information, the second information being related to a number of RACH preambles sent until a successful RACH completion; and
receive the second information from the mobile station,
wherein the transmitter is configured to broadcast third information to the mobile station, the third information being configured for transmitting a second RACH preamble, the third information being changed from the first information based on the second information,
wherein the receiver is configured to receive the second RACH preamble from the mobile station, and
wherein the receiver is configured to receive the second RACH preamble without fourth information, the fourth information being related to a number of RACH preambles sent until a successful RACH completion.

17. The base station according to claim 16, wherein the receiver is configured to receive the second information after receiving the first RACH preamble.

18. The base station according to claim 16, wherein the transmitter is configured to broadcast the third information after receiving the second information.

19. The base station according to claim 16, wherein the receiver is configured to receive the second information after transmitting a signal to the mobile station.

20. The base station according to claim 19, wherein the signal is a response to the first RACH preamble.

21. The base station according to claim 16, wherein the first information is configured for determining transmission power of the first RACH preamble.

22. The base station according to claim 16, wherein the third information is configured for determining transmission power of the second RACH preamble.

23. A method of a base station the method comprising:
broadcasting first information to a mobile station, the first information being configured for transmitting a first RACH preamble;
receiving the first RACH preamble from the mobile station,
wherein the first RACH preamble is received without second information, the second information being related to a number of RACH preambles sent until a successful RACH completion;
receiving the second information from the mobile station;
broadcasting third information to the mobile station, the third information being configured for transmitting a second RACH preamble, the third information being changed from the first information based on the second information; and receiving a second RACH preamble from the mobile station,
wherein the second RACH preamble is received without fourth information, the fourth information being related to a number of RACH preambles sent until a successful RACH completion.

24. The method according to claim 23, wherein the second information is received after receiving the first RACH preamble.

25. The method according to claim 23, wherein the third information is transmitted after receiving the second information.

26. The method according to claim 23, wherein the second information is received after transmitting a signal to the mobile station.

27. The method according to claim 26, wherein the signal is a response to the first RACH preamble.

28. The method according to claim 23, wherein the first information is configured for determining transmission power of the first RACH preamble.

29. The method according to claim 28, wherein the first information is related to initial preamble power.

30. The method according to claim 23, wherein the third information is configured for determining transmission power of the second RACH preamble.

31. A mobile station comprising:
a receiver configured to receive first information from a base station; and
a transmitter configured to:
 transmit, to the base station, a first RACH preamble based on the first information,
  wherein the first RACH preamble is transmitted separately from second information, the second information being related to a number of RACH preambles sent until a successful RACH completion; and
 transmit the second information to the base station,
wherein the receiver is configured to receive third information from the base station, the third information being changed from the first information based on the second information,
wherein the transmitter is configured to transmit, to the base station, a second RACH preamble based on the third information, and
wherein the second RACH preamble is transmitted separately from fourth information, the fourth information being related to a number of RACH preambles sent until a successful RACH completion.

32. A base station comprising:
a transmitter configured to broadcast first information to a mobile station, the first information being configured for transmitting a first RACH preamble; and
a receiver configured to:
 receive the first RACH preamble from the mobile station,
  wherein the first RACH preamble is received separately from second information, the second information being related to a number of RACH preambles sent until a successful RACH completion; and
 receive the second information from the mobile station,
wherein the transmitter is configured to broadcast third information to the mobile station, the third information being configured for transmitting a second RACH preamble, the third information being changed from the first information based on the second information,
wherein the receiver is configured to receive the second RACH preamble from the mobile station, and
wherein the receiver is configured to receive the second RACH preamble separately from fourth information, the fourth information being related to a number of RACH preambles sent until a successful RACH completion.

33. A method of a mobile station, the method comprising:
receiving first information from a base station;
transmitting, to the base station, a first RACH preamble based on the first information,
 wherein the first RACH preamble is transmitted separately from second information, the second information being related to a number of RACH preambles sent until a successful RACH completion;
transmitting the second information to the base station;
receiving third information from the base station, the third information being changed from the first information based on the second information; and
transmitting, to the base station, a second RACH preamble based on the third information,
wherein the second RACH preamble is transmitted separately from fourth information, the fourth information being related to a number of RACH preambles sent until a successful RACH completion.

34. A method of a base station, the method comprising:
broadcasting first information to a mobile station, the first information being configured for transmitting a first RACH preamble;
receiving the first RACH preamble from the mobile station,
 wherein the first RACH preamble is received separately from second information, the second information being related to a number of RACH preambles sent until a successful RACH completion;
receiving the second information from the mobile station;
broadcasting third information to the mobile station, the third information being configured for transmitting a second RACH preamble, the third information being changed from the first information based on the second information; and
receiving the second RACH preamble from the mobile station separately from fourth information, the fourth information being related to a number of RACH preambles sent until a successful RACH completion.

* * * * *